US010781056B2

(12) United States Patent
Filipovic et al.

(10) Patent No.: US 10,781,056 B2
(45) Date of Patent: *Sep. 22, 2020

(54) ADAPTIVE APPARATUS AND SYSTEM FOR AUTOMATED HANDLING OF COMPONENTS

(71) Applicant: General Electric Company, Schenectady, NY (US)

(72) Inventors: Dragan Filipovic, Garching (DE); Sultan Shair, Ismaning (DE); Mathias Ernst Messmer, Garching (DE); Stefaan Guido Van Nieuwenhove, Hohenkammer (DE)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,793

(22) Filed: Dec. 22, 2016

(65) Prior Publication Data

US 2018/0178991 A1 Jun. 28, 2018

(51) Int. Cl.
*B65G 47/90* (2006.01)
*B25J 15/06* (2006.01)
(Continued)

(52) U.S. Cl.
CPC ........ *B65G 47/902* (2013.01); *B25J 15/0061* (2013.01); *B25J 15/0616* (2013.01);
(Continued)

(58) Field of Classification Search
CPC . B65G 47/902; B25J 15/0052; B25J 15/0616; B25J 15/12; B25J 9/023;
(Continued)

(56) References Cited

U.S. PATENT DOCUMENTS 2,941,799 A * 6/1960 Reincke ................ B65H 3/46
  294/65
3,809,388 A * 5/1974 Downing ............. B65G 57/005
  271/20
(Continued)

FOREIGN PATENT DOCUMENTS

| CN | 104802175 A | 7/2015 |
| CN | 104875211 A | 9/2015 |

(Continued)

OTHER PUBLICATIONS

Schmalz, Video, Special Gripper SCG for Handling and Separating Carbon Composites http://video.schmalz.com/en/automated-handling/automotive/video/vacuum-special-coanda-gripper-for-handling-and-separating-carbon-composites/084-1_html?no_cache=1.
(Continued)

*Primary Examiner* — Orlando E Aviles
*Assistant Examiner* — Seahee Hong
(74) *Attorney, Agent, or Firm* — Dority & Manning, P.A.

(57) ABSTRACT

Various adaptive apparatus and systems for automated handling of components such as composite plies are provided. In one embodiment, a ply manipulation system is provided that comprises an automated machine having an arm, and a ply manipulation tool attached to the arm of the automated machine. The ply manipulation tool includes a first shuttle including a first gripper, a second shuttle including a second gripper, and an actuator. The ply manipulation system further comprises a processor that automatically controls the actuator to move the first and second shuttles linearly with respect to one another to adapt the first and second grippers to a ply shape. In another embodiment, the first and second shuttles include one or more clamping elements moveable to a position to be deployed outside a perimeter of the ply.

(Continued)

Methods for removing a ply from a sheet of material using a ply manipulation tool also are provided.

16 Claims, 17 Drawing Sheets

(51) Int. Cl.
   *F01D 25/00* (2006.01)
   *F01D 5/28* (2006.01)
   *B25J 15/00* (2006.01)

(52) U.S. Cl.
   CPC .......... *B65G 47/907* (2013.01); *F01D 5/282* (2013.01); *F01D 25/005* (2013.01); *F05D 2220/32* (2013.01); *F05D 2230/68* (2013.01); *F05D 2300/43* (2013.01); *F05D 2300/6033* (2013.01); *Y02T 50/672* (2013.01); *Y02T 50/673* (2013.01)

(58) Field of Classification Search
   CPC ........ B25J 9/04; B65H 3/0816; B65H 3/0883; H01L 21/67742; H01L 21/67748
   USPC .................................. 294/65, 119.1
   See application file for complete search history.

(56) References Cited

U.S. PATENT DOCUMENTS

| | | | |
|---|---|---|---|
| 3,856,294 A | 12/1974 | Lutts et al. | |
| 4,129,328 A * | 12/1978 | Littell | B65G 47/918 294/65 |
| 4,299,533 A | 11/1981 | Ohnaka | |
| 4,407,625 A | 10/1983 | Shum | |
| 4,428,793 A * | 1/1984 | Sato | B65H 3/0816 156/285 |
| 4,579,329 A | 4/1986 | Frost et al. | |
| 4,722,256 A | 2/1988 | Kuehnert | |
| 4,806,070 A | 2/1989 | Poux et al. | |
| 5,024,575 A | 6/1991 | Anderson | |
| 5,127,695 A * | 7/1992 | Zoeten | B66C 1/24 294/119.1 |
| 5,183,670 A | 2/1993 | Trudeau | |
| 5,429,009 A * | 7/1995 | Wolfe | B62D 57/032 180/8.5 |
| 5,885,052 A | 3/1999 | Tsuji et al. | |
| 6,131,973 A | 10/2000 | Trudeau et al. | |
| 6,641,131 B2 * | 11/2003 | Stohr | B65H 3/0883 294/65 |
| 6,675,712 B2 * | 1/2004 | Marincic | B65H 3/0825 101/477 |
| 6,896,513 B2 | 5/2005 | Bachrach et al. | |
| 7,029,046 B2 * | 4/2006 | Lim | B23Q 5/40 294/65 |
| 7,364,616 B2 * | 4/2008 | Tsuchiya | B65H 3/0816 117/2 |
| 7,611,180 B1 | 11/2009 | Fisher et al. | |
| 7,942,403 B2 * | 5/2011 | Dangelewicz | B65H 3/0816 271/170 |
| 8,231,125 B2 | 7/2012 | Hendle et al. | |
| 8,328,940 B2 | 12/2012 | Choi et al. | |
| 8,555,760 B2 | 10/2013 | Heidlmayer et al. | |
| 8,826,957 B2 | 9/2014 | Shair et al. | |
| 8,936,289 B1 | 1/2015 | Kozlowski et al. | |
| 2003/0015881 A1* | 1/2003 | Neveu | B25J 15/0052 294/65 |
| 2004/0109751 A1 | 6/2004 | Whitcomb et al. | |
| 2008/0089772 A1 | 4/2008 | Mueller-Hummel | |
| 2008/0171435 A1 | 7/2008 | Fujii et al. | |
| 2008/0202420 A1 | 8/2008 | Smith et al. | |
| 2008/0202892 A1 | 8/2008 | Smith et al. | |
| 2008/0206022 A1 | 8/2008 | Smith et al. | |
| 2009/0133524 A1* | 5/2009 | Fukano | B25J 15/0273 74/479.01 |
| 2011/0259515 A1 | 10/2011 | Rotter et al. | |
| 2012/0004774 A1* | 1/2012 | Umetsu | B25J 5/007 700/254 |
| 2012/0138218 A1 | 6/2012 | Dean et al. | |
| 2012/0330453 A1 | 12/2012 | Samak Sangari et al. | |
| 2014/0090528 A1 | 4/2014 | Graf | |
| 2015/0246522 A1 | 9/2015 | Nelson et al. | |
| 2015/0314584 A1 | 11/2015 | Dong et al. | |
| 2016/0005638 A1 | 1/2016 | Agarwal et al. | |

FOREIGN PATENT DOCUMENTS

| | | |
|---|---|---|
| CN | 105110061 A | 12/2015 |
| CN | 204917410 U | 12/2015 |
| DE | 4035004 A1 | 5/1992 |
| EP | 0419461 B1 | 9/1998 |
| EP | 1099538 B1 | 12/2004 |
| EP | 2536552 B1 | 5/2014 |
| JP | 2002120186 A | 4/2002 |
| JP | 2006255801 A | 9/2006 |
| KR | 100751495 B1 | 8/2007 |
| KR | 100754880 B1 | 8/2007 |

OTHER PUBLICATIONS

Schmalz, Video, Needle Gripper SNG-M for Handling Composite Textiles and Preforms http://www.video.schmalz.com/en/automated-handling/automotive/video/schmalz-needle-gripper-sng-m-for-handling-composite-textiles-and-preforms/134-1.html?no_cache=1.

* cited by examiner

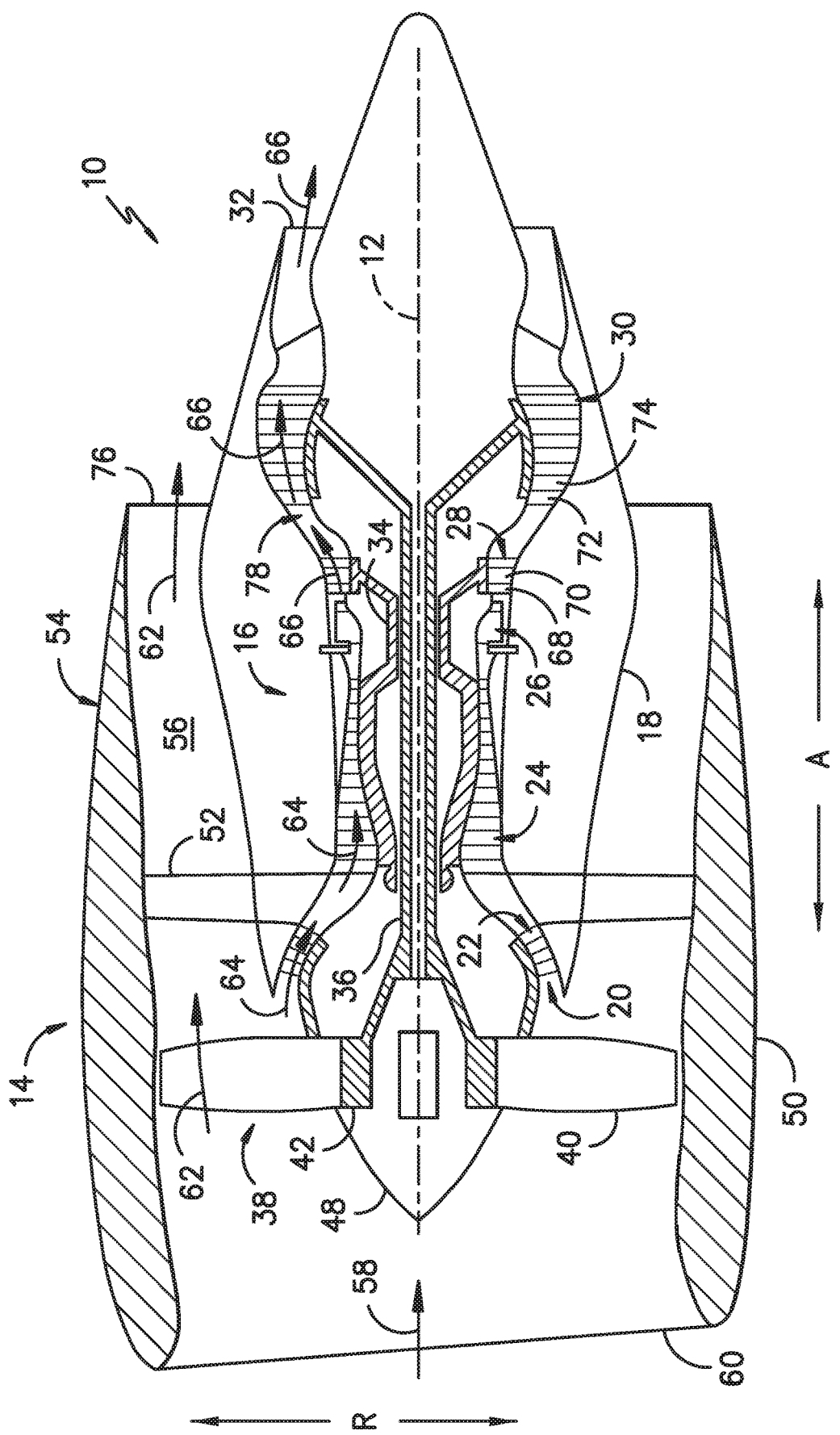
FIG. -1-

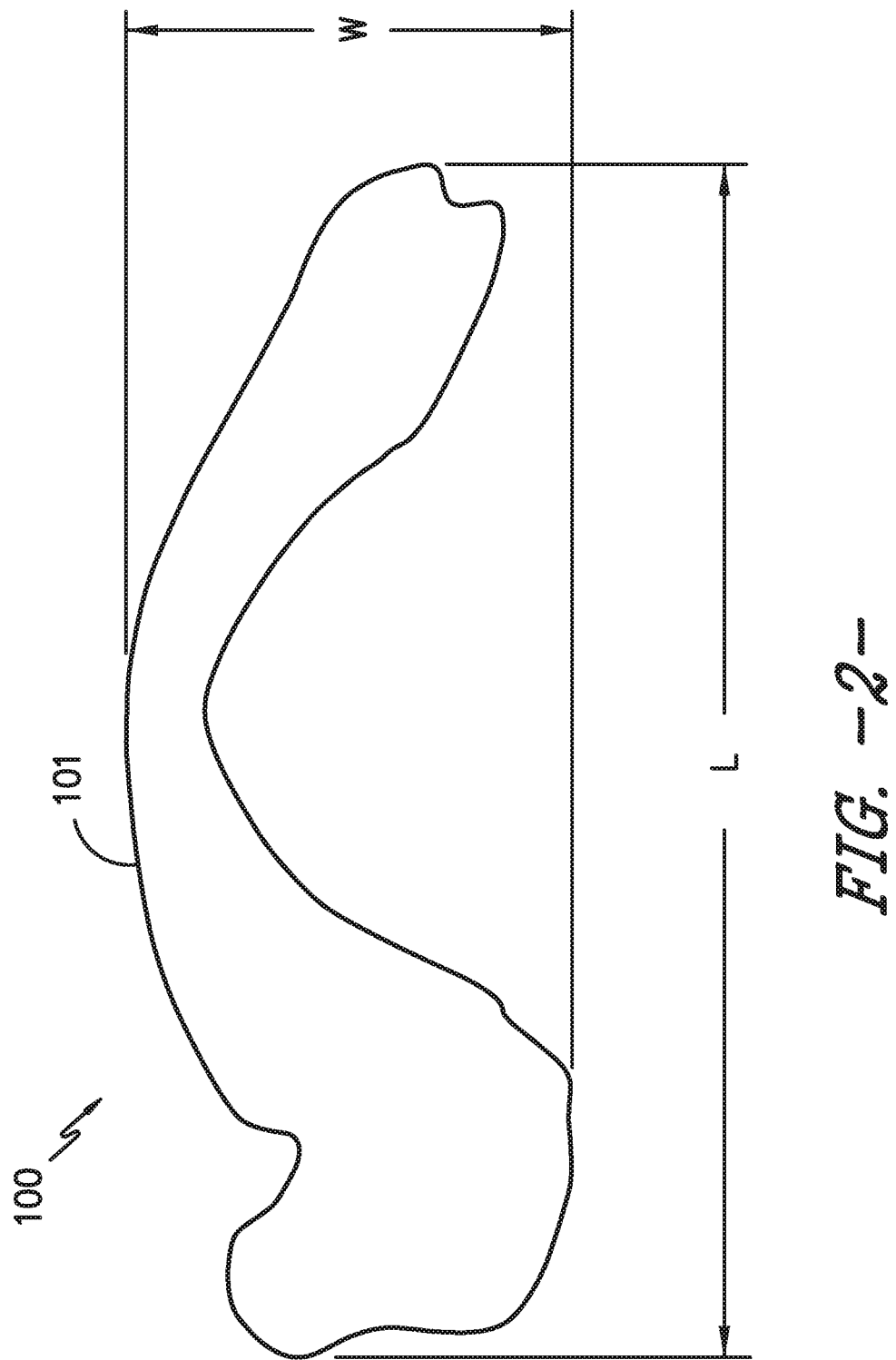
FIG. -2-

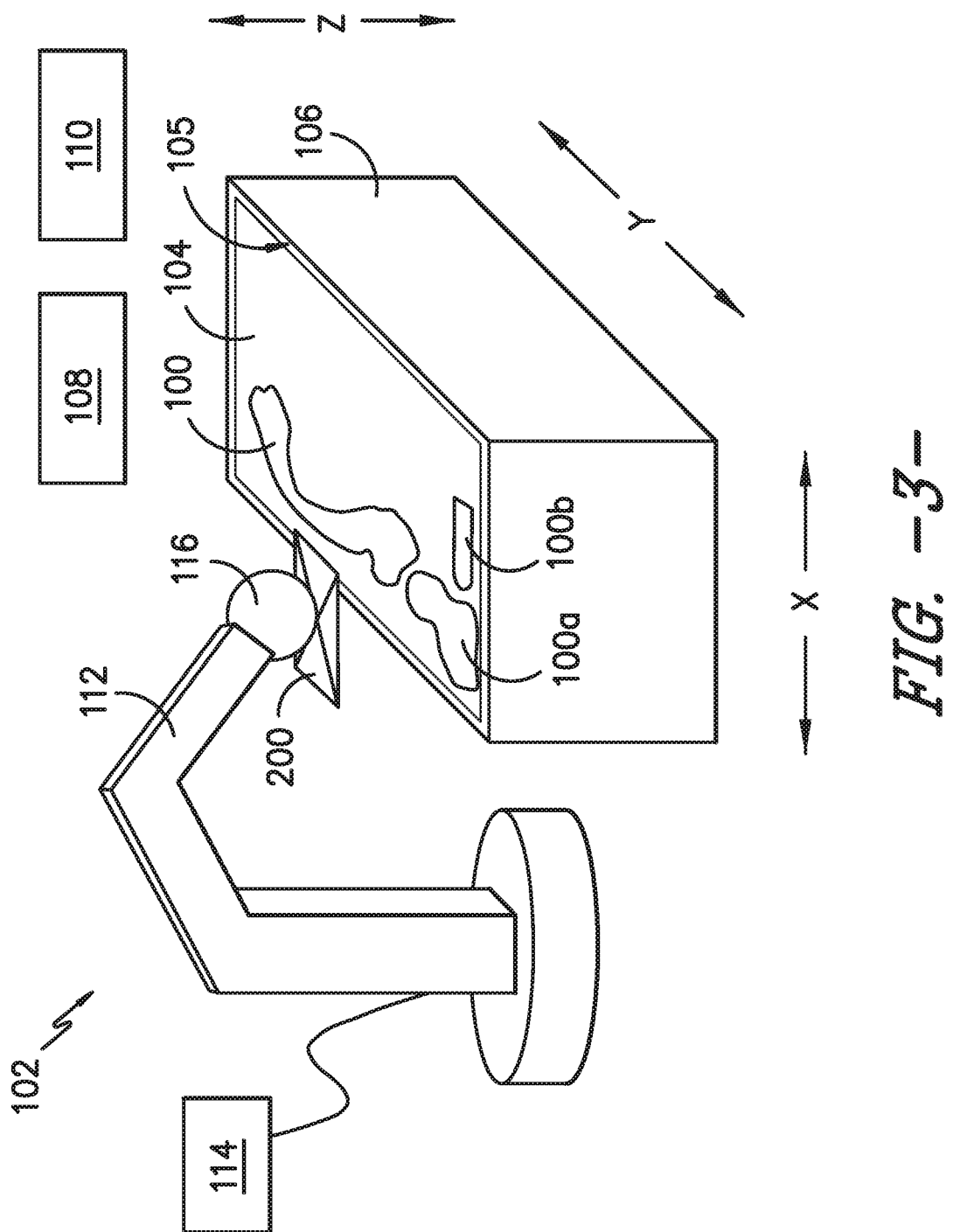
FIG. -3-

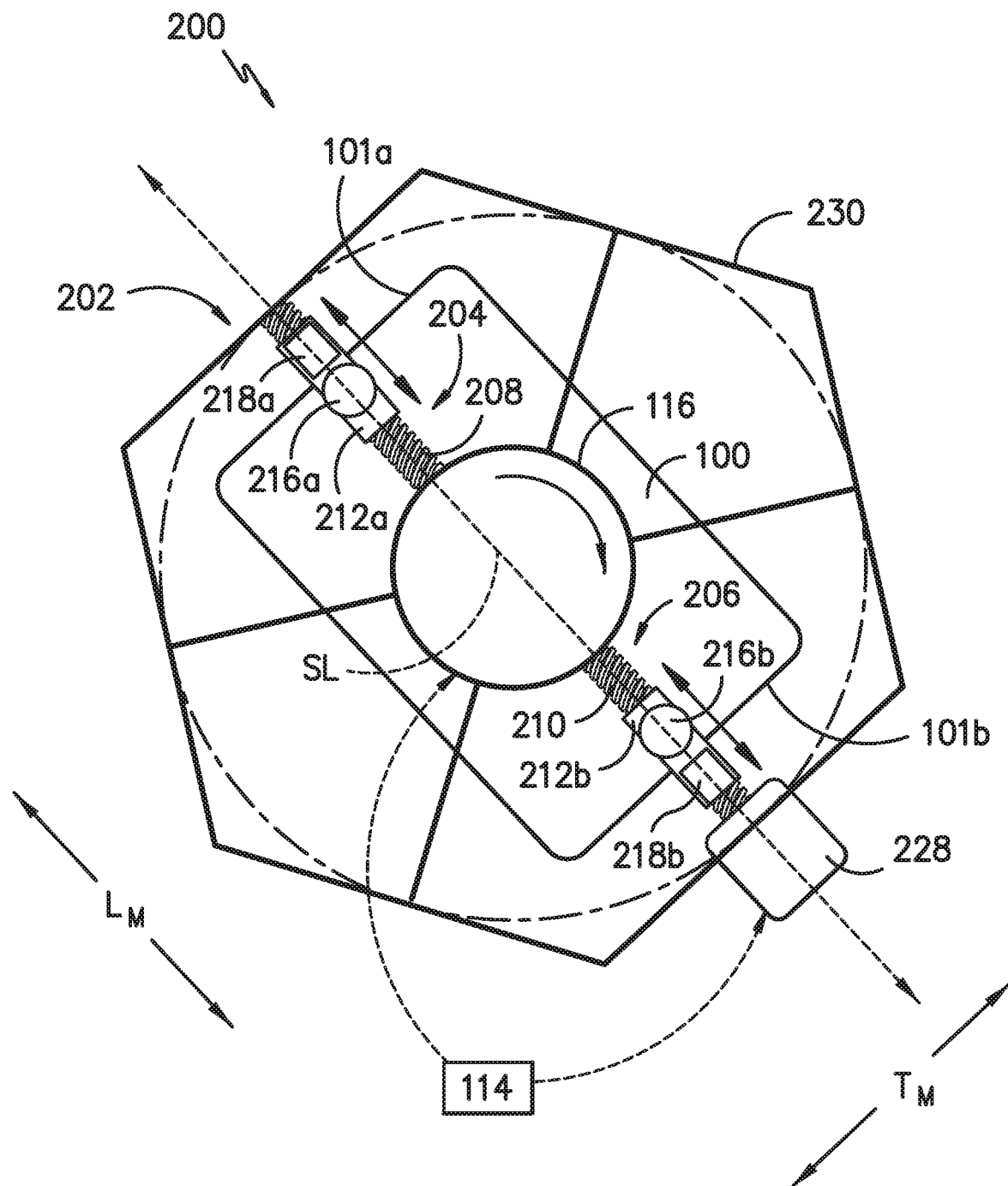
FIG. -4-

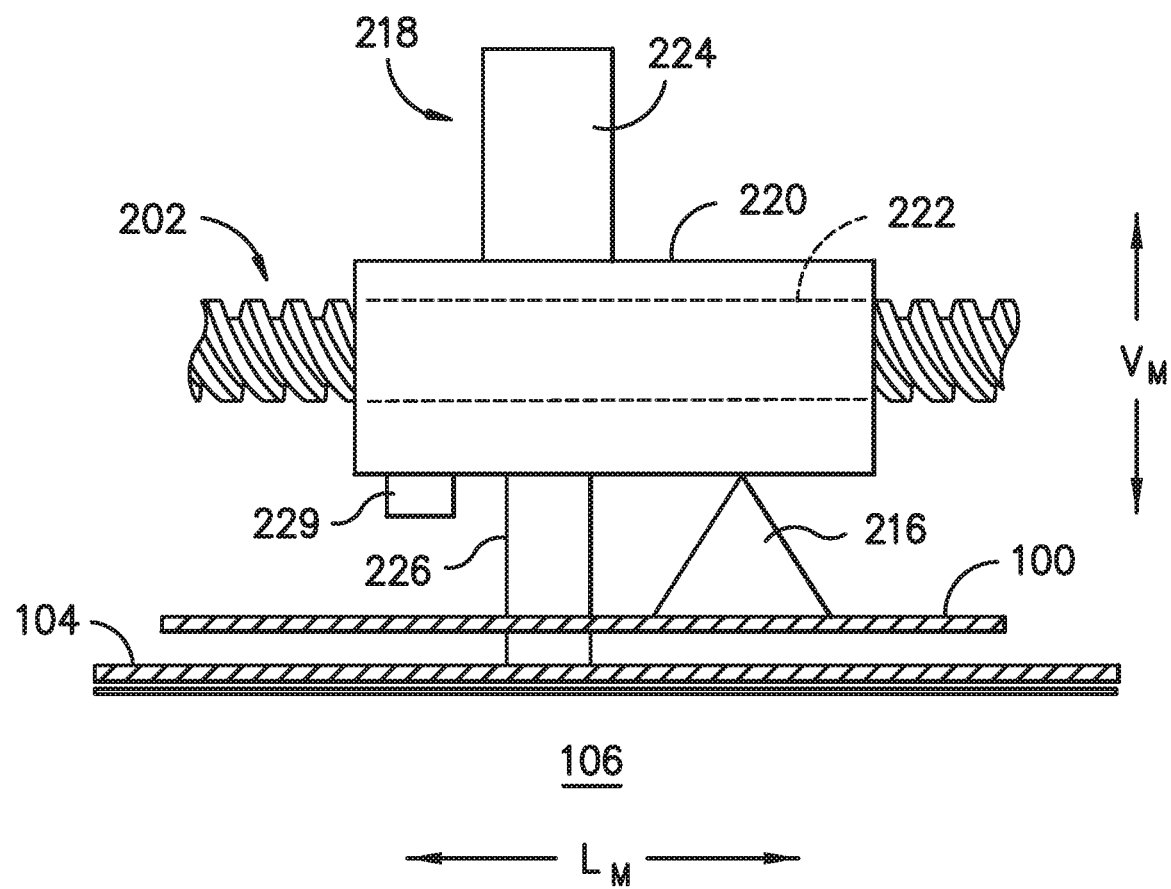
FIG. -5A-

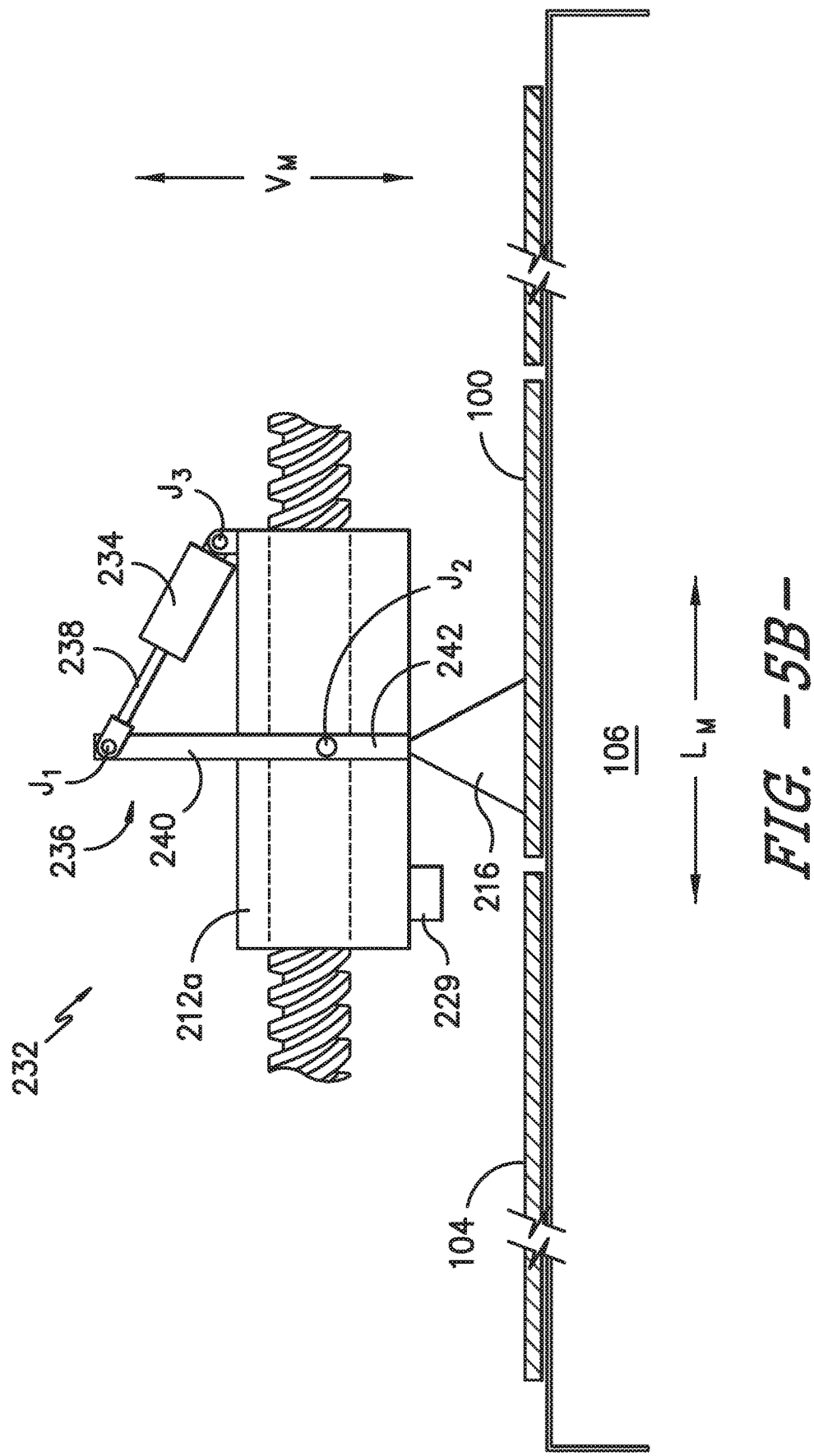
FIG. -5B-

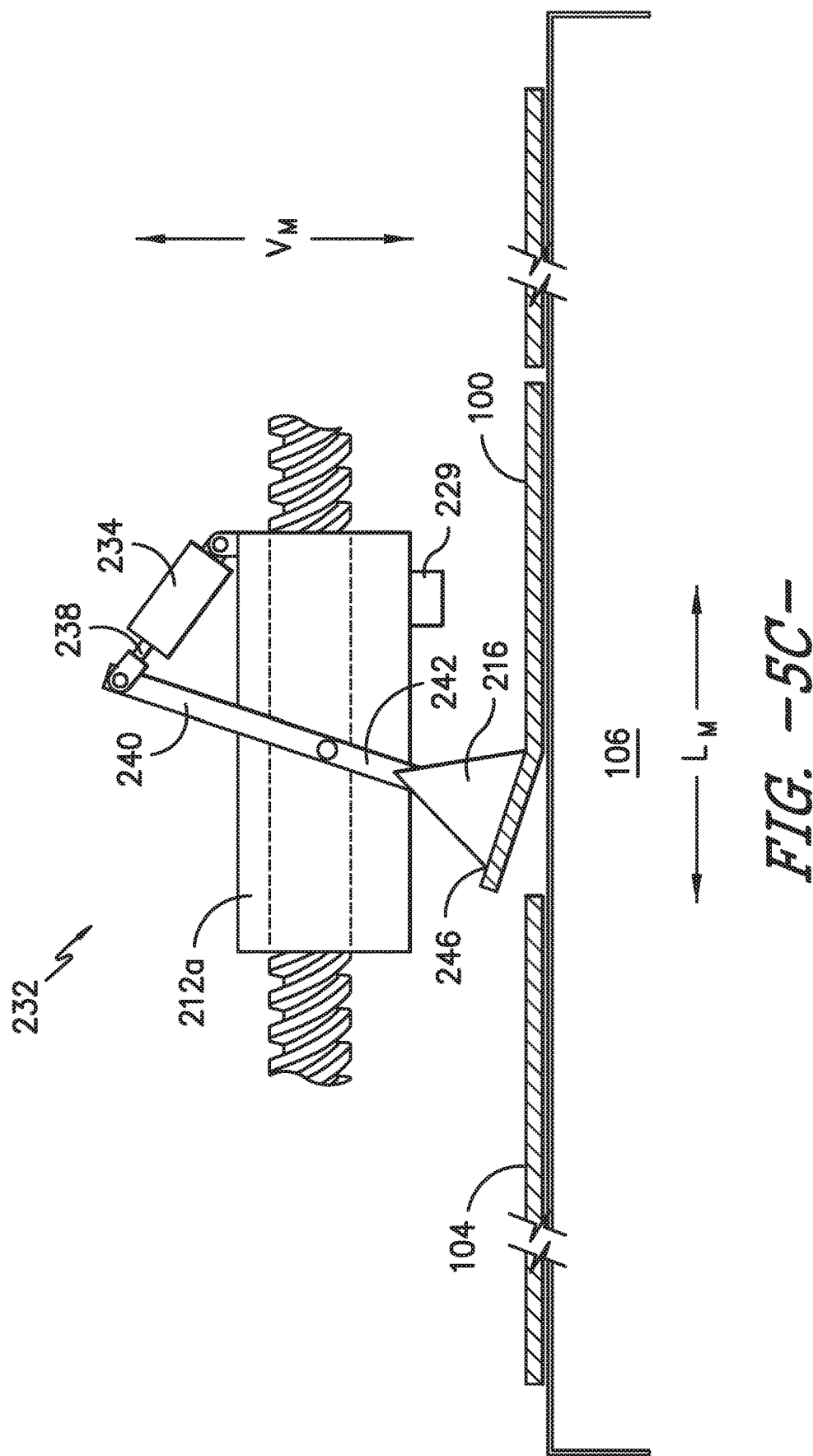

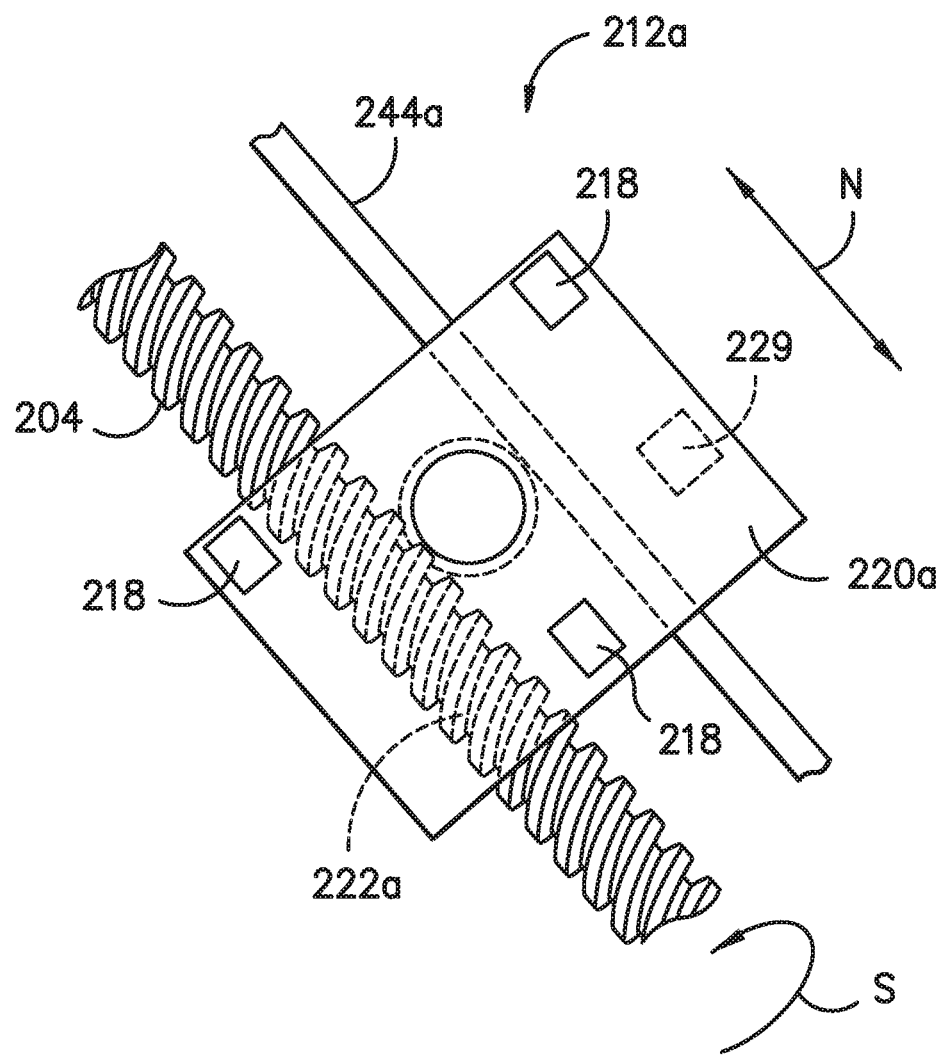
FIG. -5D-

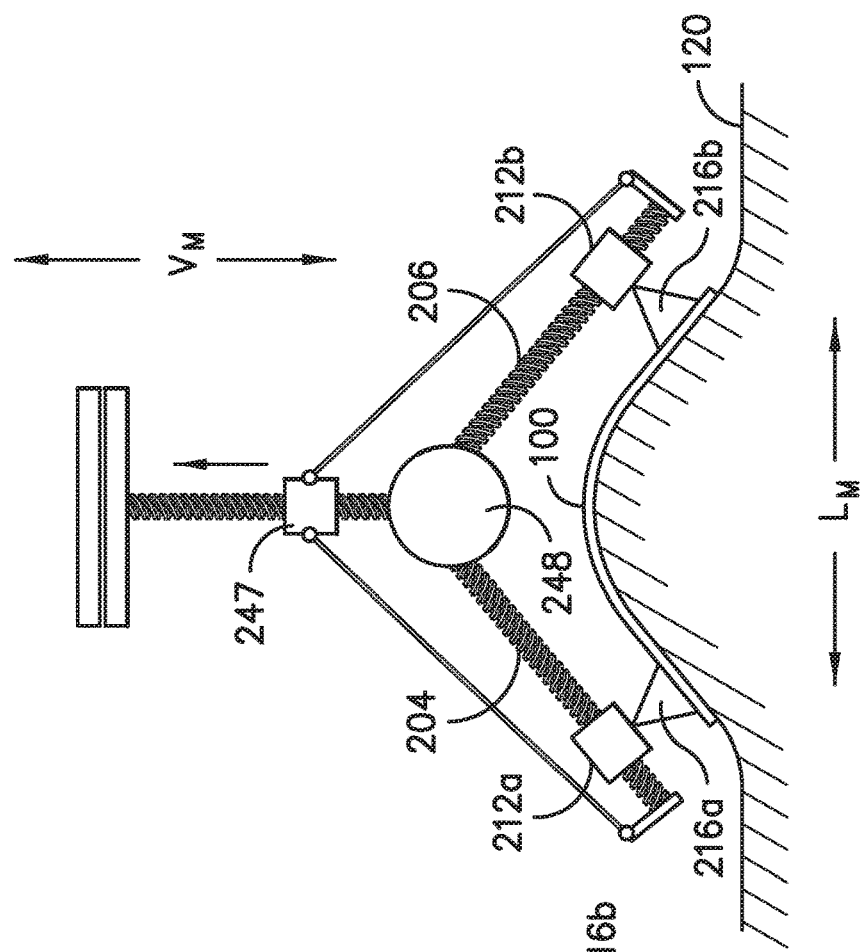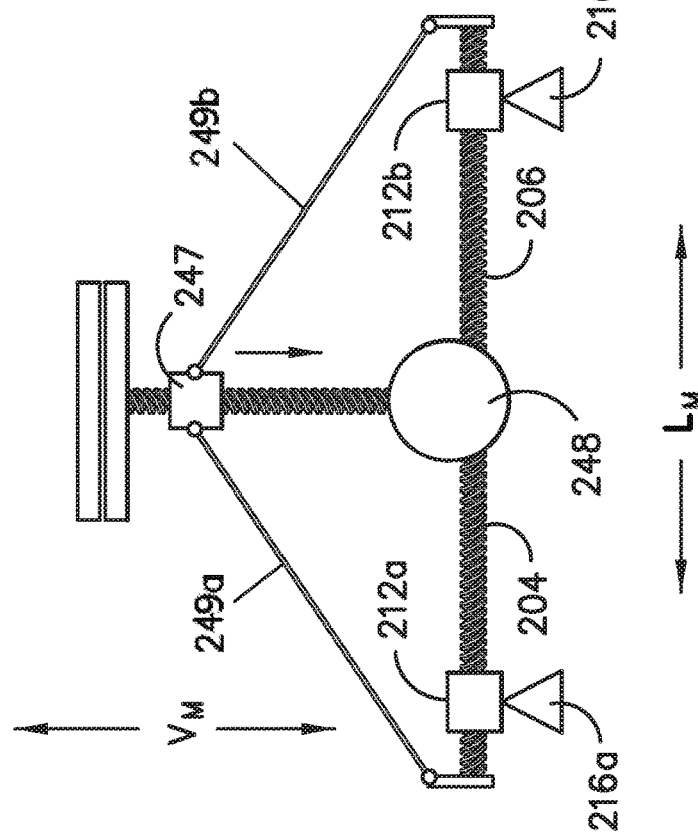
FIG. -5E-

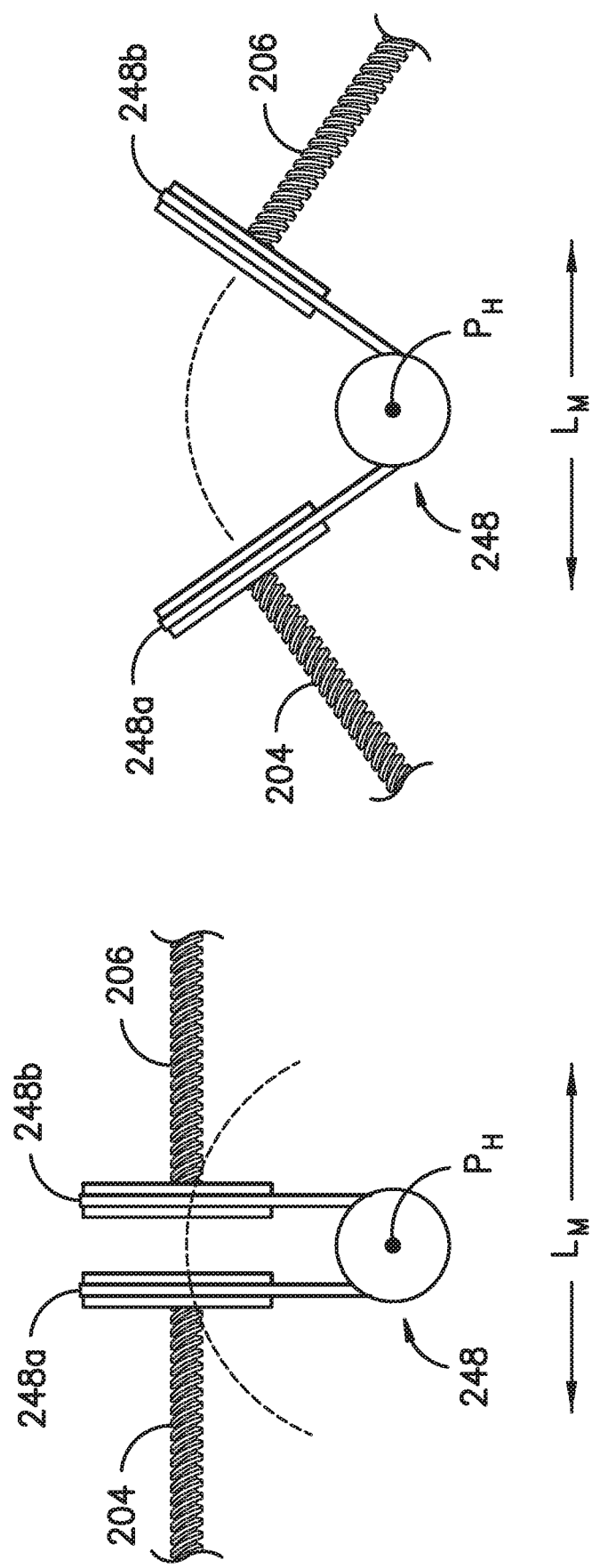
FIG. -5F-

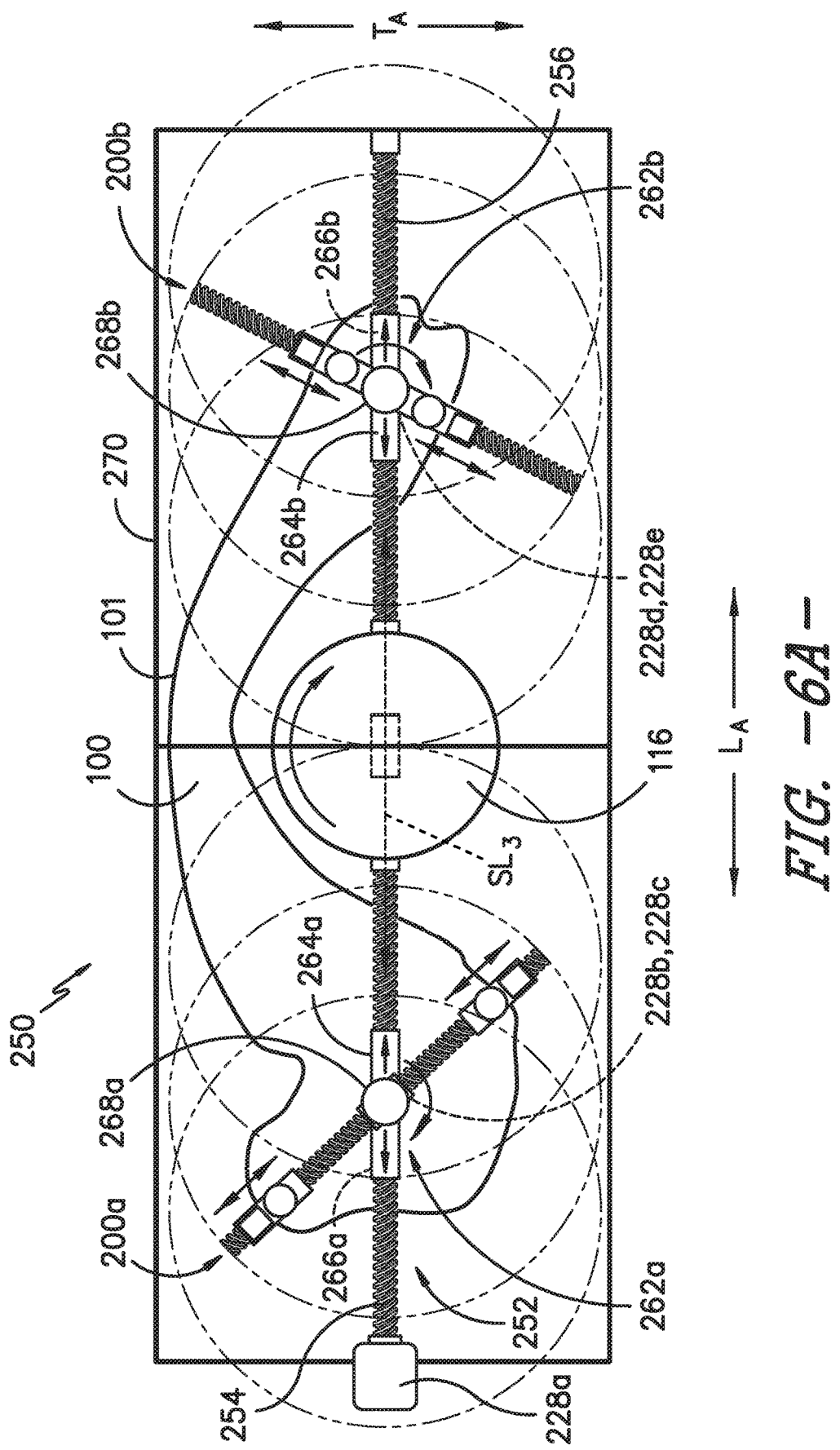
FIG. -6A-

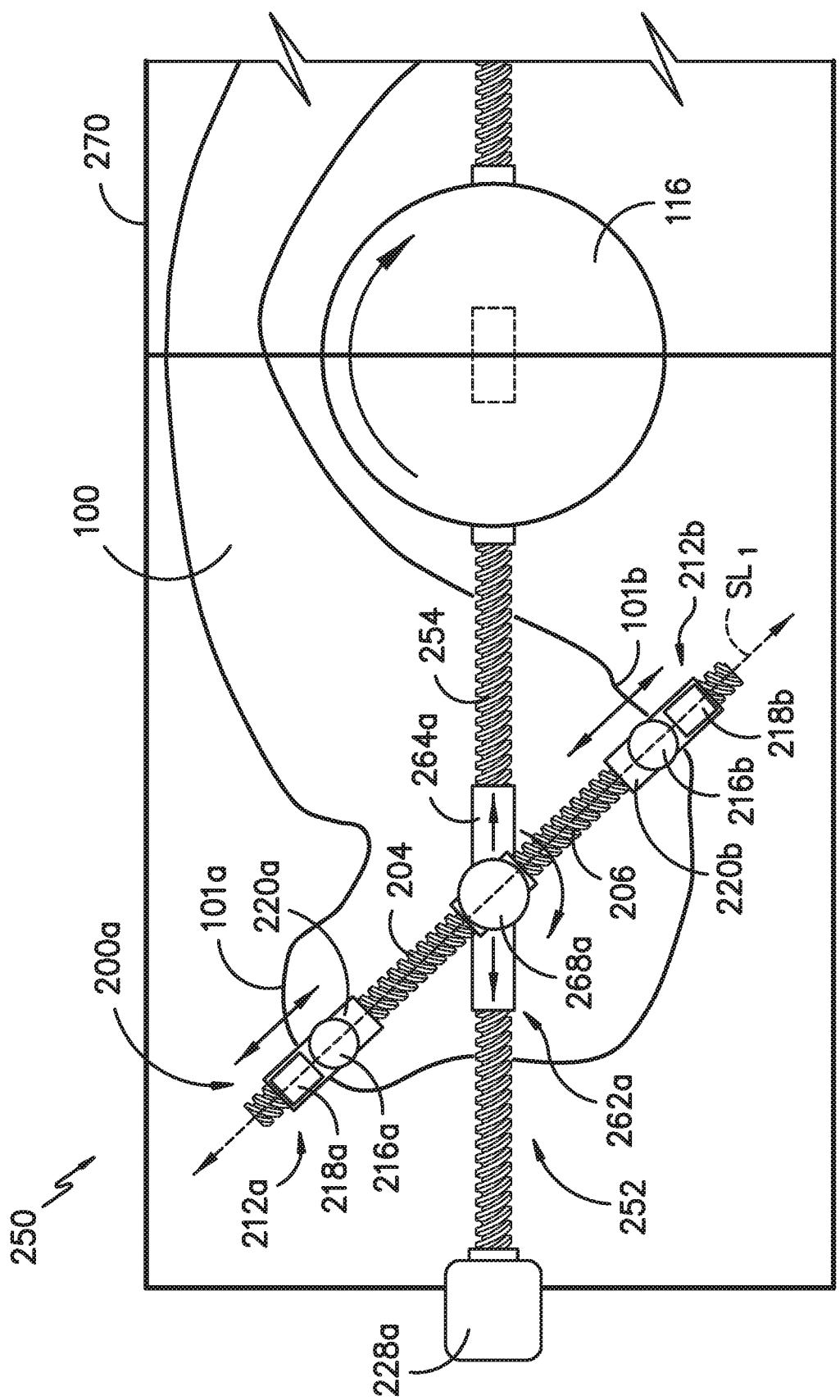
FIG. -6B-

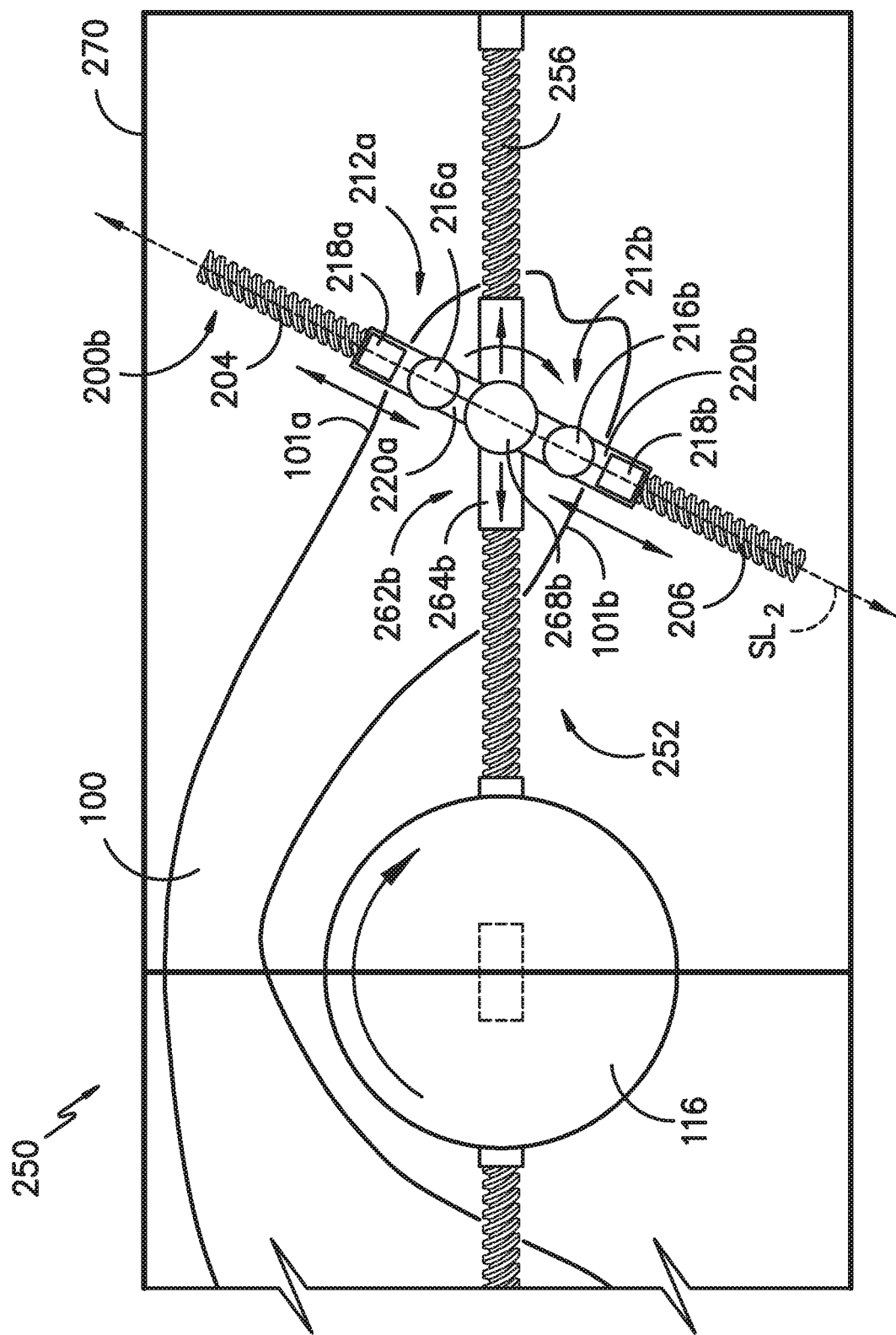

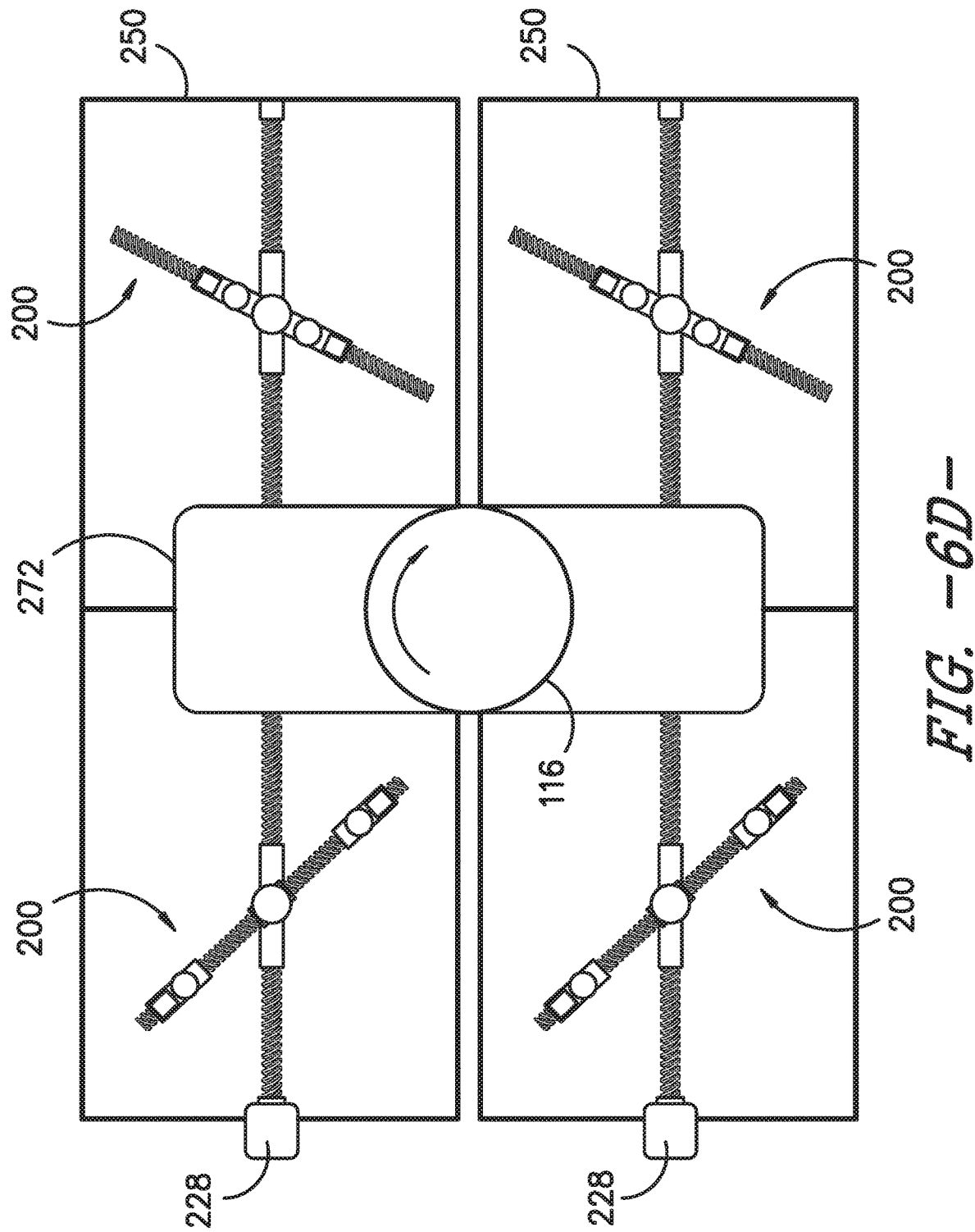
FIG. -6D-

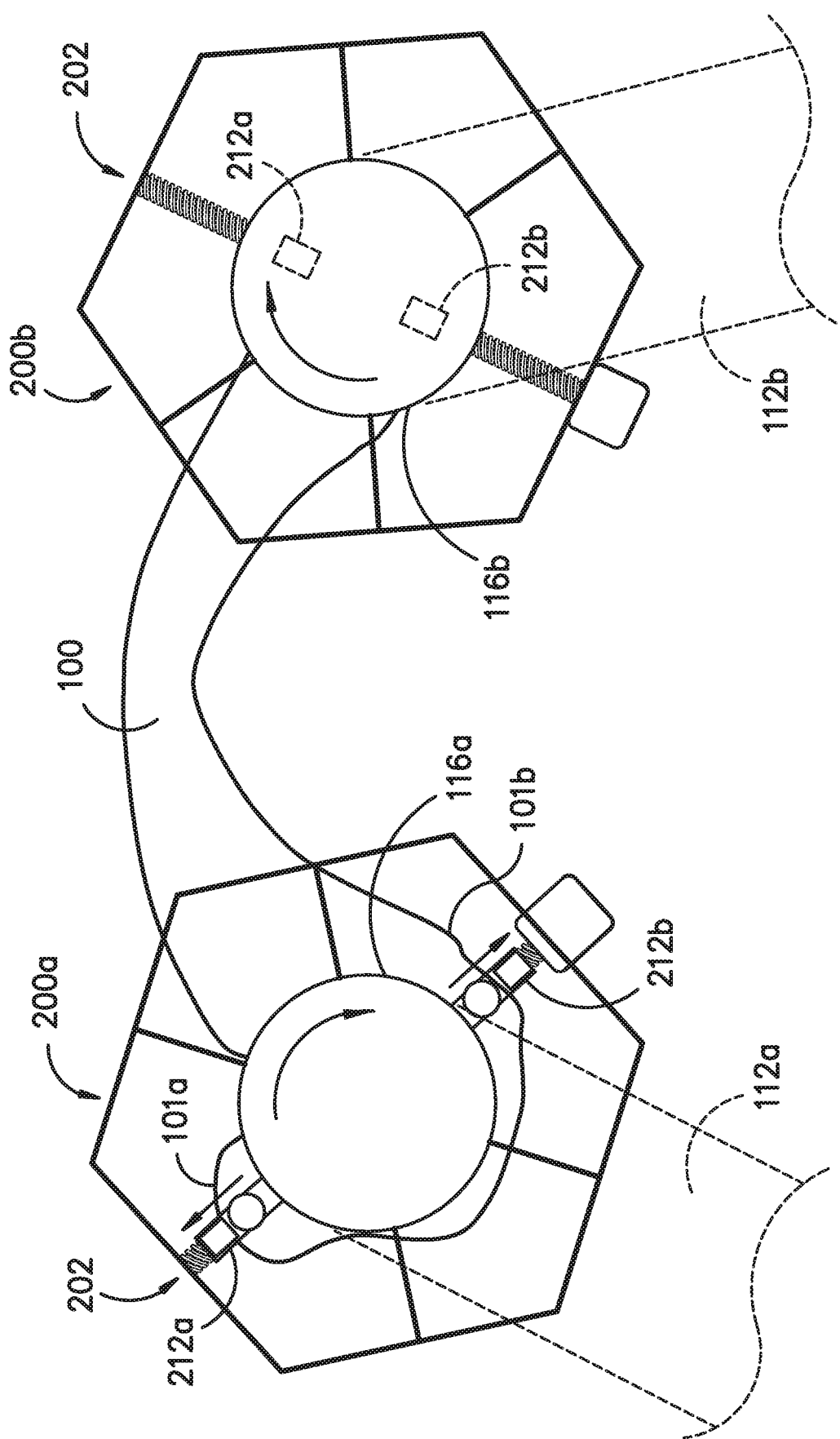
FIG. -7-

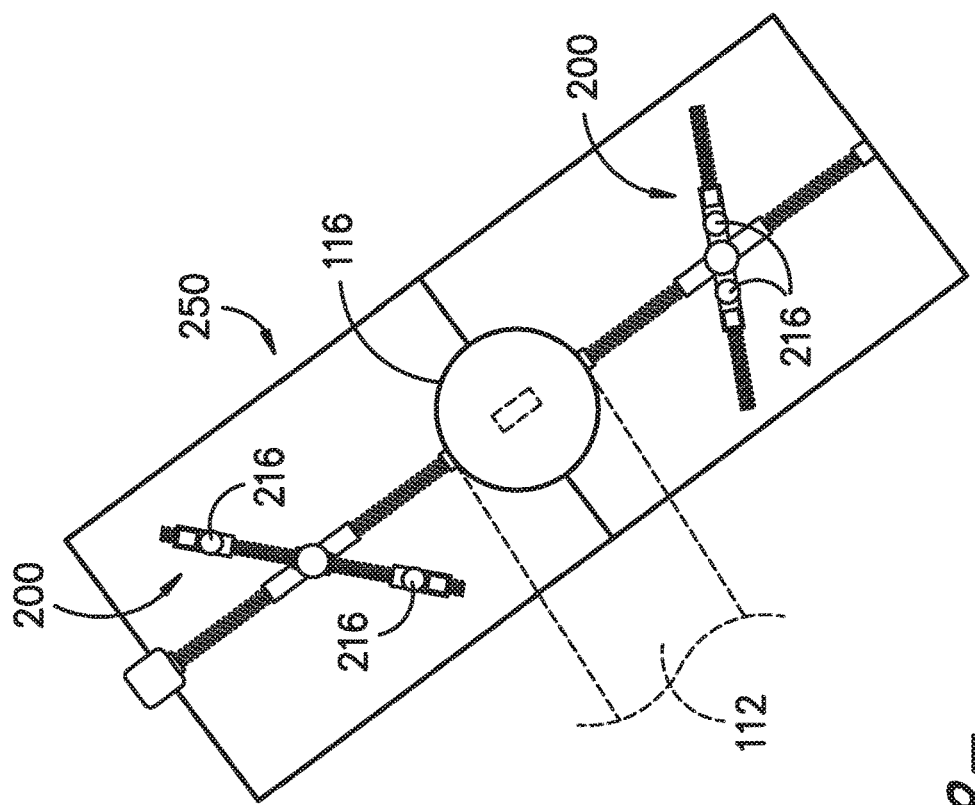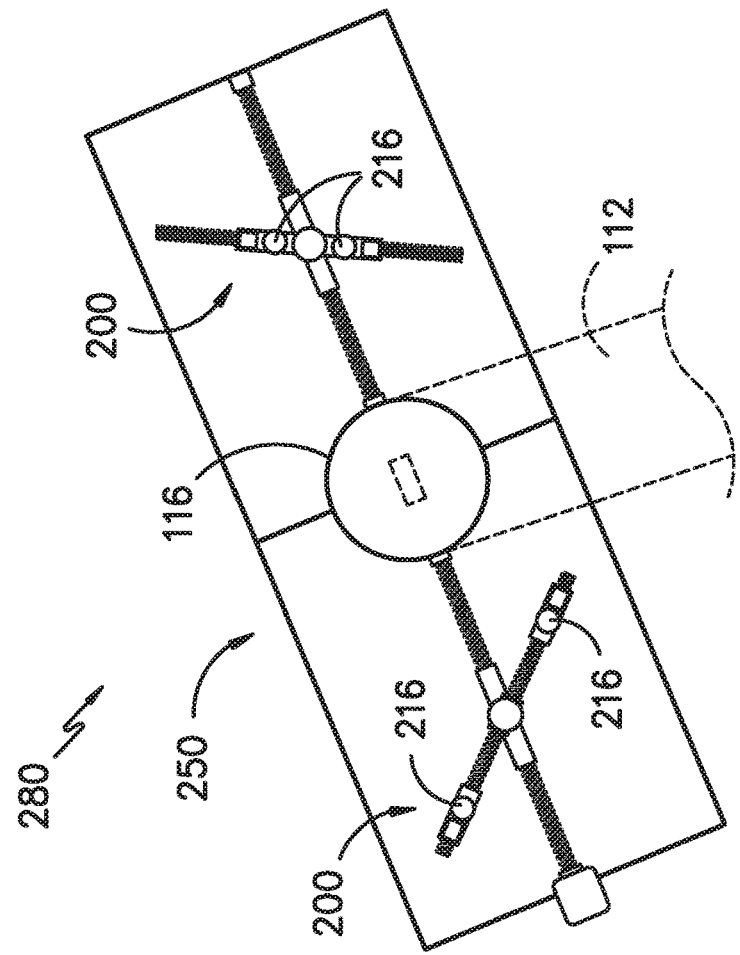
FIG. -8-

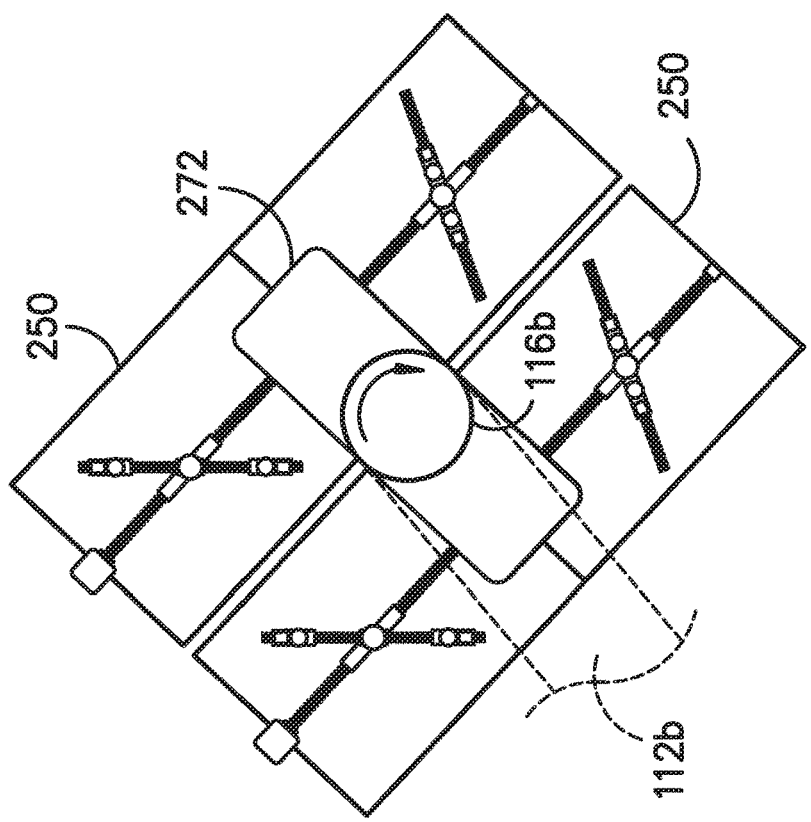
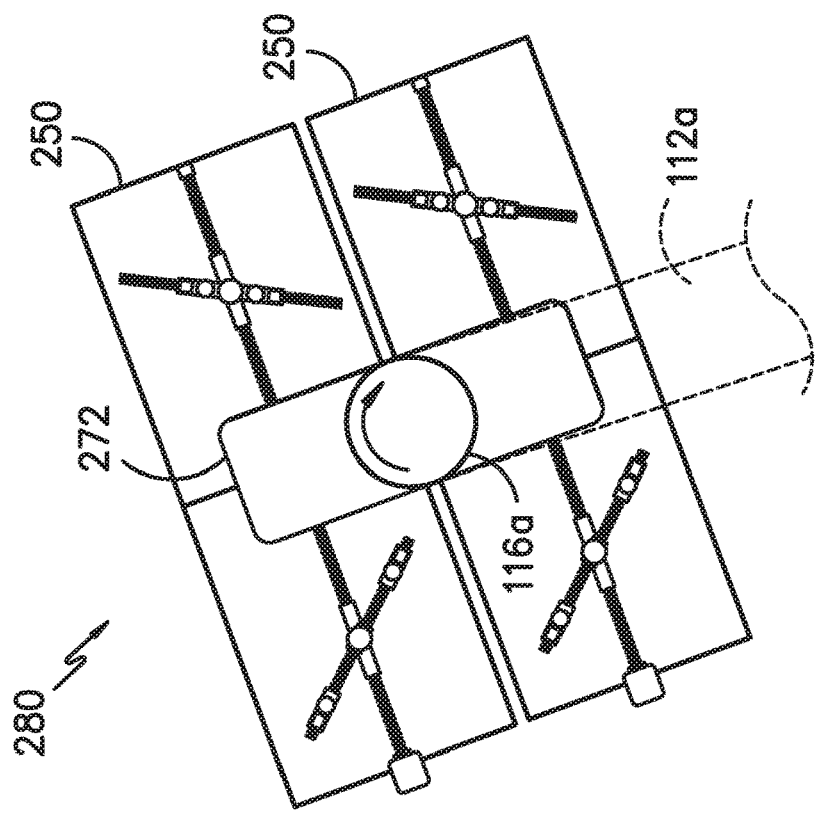
FIG. -9-

ADAPTIVE APPARATUS AND SYSTEM FOR AUTOMATED HANDLING OF COMPONENTS

FIELD

The present subject matter relates generally to automated manufacturing processes. More particularly, the present subject matter relates to apparatus adaptable for handling components of a variety of shapes. Most particularly, the present subject matter relates to apparatus handling plies of a variety of shapes.

BACKGROUND

Composite materials are more commonly being used for fabrication of a wide variety of components. For example, carbon fiber composites have high strength and a low weight, making carbon fiber composites attractive for use in aviation applications that require these functionalities. As another example, ceramic matrix composite (CMC) materials can withstand relatively extreme temperatures; accordingly, there is particular interest in replacing components within a combustion gas flow path of a gas turbine engine with components made from CMC materials. Many composite materials, such as carbon fiber and CMC materials, are formed into plies of the composite material, and the composite plies may be laid up to form a preform component that may then undergo various processing cycles to arrive at a component formed from the composite material.

Typically, composite components formed from plies of the composite material comprise many composite plies. Each ply is cut from a sheet of the composite material, and then the cut composite plies are laid up to form one or more ply stacks that form the component preform. Often, the cut plies are manually removed from the sheet and manually placed in a ply storage area or manually stacked. Thus, the handling and forming of composite preforms is a time consuming and labor intensive process, which increases the cost of the part.

Automating the removal and storage or stacking of the preform process could reduce the part cost and cycle time, as well as reduce employee health concerns from the repetitive nature of ply removal and handling. However, several barriers must be overcome to automate the process of removing composite plies from the sheet of composite material and moving the plies either to a ply storage area or for stacking. For example, to maximize material usage and minimize material waste, a variety of ply shapes and sizes are nested within the composite sheet and then cut prior to removal. Therefore, an automated apparatus for removing the composite plies must be able to adapt to a variety of ply shapes. Also, the automated apparatus must be able to remove the composite ply from the nested plies without displacing the skeleton or remaining composite sheet material. As another example, for large composite plies, the automated apparatus must be able to maintain tension on a ply as it is removed and moved to prevent damaging the ply as it is removed or moved.

Accordingly, an automated ply manipulation apparatus would be desirable. For example, a ply manipulation end effector for a robotic arm would be beneficial. In particular, a ply manipulation apparatus with features for automatically adjusting a position of grippers used to pick up a ply would be useful. Additionally, a modular ply manipulation tool for adapting to a plurality of ply shapes and/or sizes would be helpful.

BRIEF DESCRIPTION

Aspects and advantages of the invention will be set forth in part in the following description, or may be obvious from the description, or may be learned through practice of the invention.

In one exemplary embodiment of the present disclosure, a ply manipulation system is provided. The ply manipulation system comprises an automated machine having an arm, and a ply manipulation tool attached to the arm of the automated machine. The ply manipulation tool includes a first shuttle including a first gripper, a second shuttle including a second gripper, and an actuator. The ply manipulation system further comprises a processor that automatically controls the actuator to move the first and second shuttles linearly with respect to one another to adapt the first and second grippers to a ply shape.

In another exemplary embodiment of the present disclosure, a ply manipulation system is provided. The ply manipulation system comprises an automated machine having a first arm and a first ply manipulation tool attached to the first arm of the automated machine. The first ply manipulation tool includes a first shuttle including a first gripper and a first clamping element, and a second shuttle including a second gripper and a second clamping element. Each gripper is moveable to a position to grip a ply having a ply shape and each clamping element is moveable to a position to be deployed outside a perimeter of the ply. The ply manipulation system further comprises a processor configured for automatically adapting the position of each gripper according to the ply shape.

In a further exemplary embodiment of the present disclosure, a method for removing a ply from a sheet of material using a ply manipulation tool is provided. The ply manipulation tool includes a plurality of grippers and a plurality of clamping elements. Each gripper and clamping element is moveable to a plurality of positions, and the ply has a ply shape and a ply perimeter. The method comprises adapting the position of each gripper according to the ply shape; gripping the ply with at least one gripper; deploying at least one clamping element outside the ply perimeter; and removing the ply from the sheet along a ply removal direction. The clamping element extends in a direction opposite of the ply removal direction until the ply is removed from the sheet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a top view of an arbitrarily shaped composite ply according to an exemplary embodiment of the present subject matter.

FIG. 3 provides a schematic view of an automated machine positioned for removing plies cut from a sheet of composite material laid on a cutting table and for moving the removed plies to a suitable location.

FIG. 4 provides a top, schematic view of a ply manipulation tool module according to an exemplary embodiment of the present subject matter.

FIG. 5A provides a side, schematic view of a shuttle of the ply manipulation tool module of FIG. 4 according to an exemplary embodiment of the present subject matter.

FIG. 5B provides a side, schematic view of a tilting gripper assembly of the ply manipulation tool module of FIG. 4 according to an exemplary embodiment of the present subject matter.

FIG. 5C provides a side, schematic view of the gripper assembly of FIG. 5B lifting a ply from a cutting table according to an exemplary embodiment of the present subject matter.

FIG. 5D provides a top, schematic view of a nut assembly of the ply manipulation tool module of FIG. 4 according to an exemplary embodiment of the present subject matter.

FIG. 5E provides side, schematic views of the ply manipulation tool module of FIG. 4 according to an exemplary embodiment of the present subject matter.

FIG. 5F provides partial schematic views of the ply manipulation tool module of FIG. 5E.

FIG. 6A provides a top, schematic view of a ply manipulation tool assembly according to an exemplary embodiment of the present subject matter.

FIG. 6B provides an enlarged view of a portion of the ply manipulation tool assembly of FIG. 6A according to an exemplary embodiment of the present subject matter.

FIG. 6C provides an enlarged view of another portion of the ply manipulation tool assembly of FIG. 6A according to an exemplary embodiment of the present subject matter.

FIG. 6D provides a top, schematic view of a plurality of ply manipulation tool assemblies coupled to a flange for attaching the assemblies to an automated machine according to an exemplary embodiment of the present subject matter.

FIG. 7 provides a top, schematic view of two ply manipulation tool modules, each module attached to a separate robotic arm, according to an exemplary embodiment of the present subject matter.

FIG. 8 provides a top, schematic view of a ply manipulation system including two ply manipulation tool assemblies, each assembly attached to a separate robotic arm, according to an exemplary embodiment of the present subject matter.

FIG. 9 provides a top, schematic view of a ply manipulation system including a plurality of ply manipulation tool assemblies attached to a plurality of robotic arms according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, such as components of combustion section 26, HP turbine 28, or LP turbine 30, may comprise a ceramic matrix composite (CMC) material, which is a non-metallic material having high temperature capability. Exemplary CMC materials may include silicon carbide (SiC), silicon, silica, or alumina matrix materials, or combinations thereof, and ceramic fibers embedded within the matrix material. Additionally or alternatively, components of turbofan engine 10, such as fan 28, may comprise a carbon fiber composite material or another composite material, such as a polymer matrix composite (PMC) material. As discussed herein, such composite materials, e.g., CMC, carbon fiber, PMC, etc., are referred to generally as "composite materials" or "composites."

Components made from composite materials may be formed from plies of the composite material that are laid up to form a preform and then processed to produce the final composite component. For example, the composite material may be made as a thin sheet, and plies of the composite material (i.e., composite plies), may be cut from each sheet of composite material. Often, hundreds or thousands of plies are required to form one composite component. Typically, each ply is removed from the sheet of composite material manually, i.e., by human hands, and either manually moved to a ply storage area or moved to a ply layup area, where the composite plies are laid up to form the composite preform. Accordingly, an automated process for removing and moving the composite plies could help reduce fabrication time and cost and also may help reduce errors in the fabrication process.

Some composite components utilize plies that may be relatively large in size and/or may have an arbitrary shape. For example, composite plies may have a length that ranges from about 15 centimeters (cm) to about 300 cm and a width that ranges from about 4 cm to about 120 cm. As an example of a component, plies for forming a fan blade 40 of fan 38 may be up to about 150 cm (or 1.5 meters) in length. However, other sizes of plies may be used as well. Further, some plies may have generally geometric shapes, such as generally rectangular, circular, or other another geometric shape, but other plies may have arbitrary shapes. For instance, some plies may be generally non-geometric in shape and may, e.g., comprise one or more bends, curves, and/or angles. An exemplary arbitrarily shaped ply 100, having a length L, a width W, and an edge or perimeter 101, is illustrated in FIG. 2, but it will be appreciated that the plies 100 used to form a composite component may have any shape and/or size. The shape and size of each ply 100 is arbitrary to the present subject matter, as described in greater detail herein.

Referring to FIG. 3, in exemplary embodiments of the present subject matter, one or more automated machines 102, such as a robot or the like, are used to remove composite plies 100 that have been cut from a sheet 104 of composite material that, e.g., is positioned on a cutting table 106. More particularly, the cutting table 106 may define a first horizontal direction X, a second horizontal direction Y that is perpendicular to the first horizontal direction X, and a vertical direction Z. A sheet 104 of composite material may be positioned on a top surface 105 of the table 106 such that the sheet 104 is generally planar, extending along the first horizontal direction X and the second horizontal direction Y. A plurality of plies 100 may be cut from the sheet 104, and then automated machine 102 may be used to remove the plies 100 from the sheet 104. As described herein, the automated machine 102 has one or more features such that the shape and/or size of each ply 100 is immaterial to the machine's ability to remove the plies 100 from the sheet 104; the machine 102 is configured to adapt to the shape and/or size of each ply 100 to remove the ply from the sheet. As such, the plies 100 may be referred to as arbitrarily shaped plies 100. After removing a ply 100 from the sheet 104 of composite material, the automated machine 102 may move the ply to a ply storage area 108, to a ply layup area 110, or to another suitable location away from the sheet 104. Thus, removing and moving composite plies cut from a sheet of composite material may be an automated process performed by one or more machines rather than a manual process performed by human hands.

Further, it should be understood that, although described herein with respect to composite plies 100, the present subject matter is not limited to manipulation or handling of plies of composite material. Rather, the present subject matter also may be applicable to the handling of other thin objects, which may be formed from a variety of materials, may be rigid, flexible, or semi-rigid, and/or may be an element of a finished component or a finished component.

Referring to FIG. 4, in one exemplary embodiment, an end effector in the form of a ply manipulation tool is received on a robotic arm 112 of an automated machine 102. In some embodiments, the end effector ply manipulation tool may be a ply manipulation tool module 200, but in other embodiments, described in greater detail below, an end effector ply manipulation tool in the form of a ply manipulation tool assembly 250 may be received on robotic arm 112 of automated machine 102. It will be appreciated that the automated machine 102 may include any suitable control system for controlling the features of the machine without deviating from the scope of the present disclosure. For instance, automated machine 102 may have various suitable configurations and/or control circuitries for removing one or more plies 100 from a sheet 104 of composite material, moving one or more plies 100 to a suitable location, or performing any of the various operations described herein. In the schematic depiction of FIG. 3, for example, automated machine 102 includes an articulable robotic arm 112 and module 200 for removing and moving plies 100, but machine 102 may include any suitable features and components for performing the functions described herein. Further, although described herein with respect to an articulated or 6-axis industrial type robot, it should be appreciated that any suitable robot or automated machine 102 may be used as well. For example, dual arm robots, SCARA robots, Cartesian or gantry robots, parallel or delta robots, cylindrical robots, redundant robots, or the like, as well as mobile robots or manipulators, may be suitable for use with the subject matter described herein.

In one embodiment, automated machine 102 includes a control circuit having one or more processors 114 and associated memory device(s) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) may generally be configured to store suitable computer-readable instructions that, when implemented by the processor(s) 114, configure the control circuit to perform various functions including, but not limited to, removing one or more plies 100 from the sheet of composite material and moving the one or more plies 100 to a suitable location (e.g., a ply storage area or a ply layup area) or other functions. More particularly, the instructions may configure the control circuit to perform functions such as receiving directly or indirectly signals from one or more sensors (e.g. voltage sensors, current sensors, and/or other sensors) indicative of various input conditions, and/or various other suitable computer-implemented functions, which enable the automated machine(s) 102 to carry out the various functions described herein. An interface can include one or more circuits, terminals, pins, contacts, conductors, or other components for sending and receiving control signals. Moreover, the control circuit may include a sensor interface (e.g., one or more analog-to-digital converters) to permit signals transmitted from any sensors within the system to be converted into signals that can be understood and processed by the processor(s) 114.

FIG. 4 provides a top view of a ply manipulation tool module 200 according to an exemplary embodiment of the present subject matter. The module 200 defines a longitudinal direction $L_M$, a transverse direction $T_M$, and a vertical direction $V_M$ (FIG. 5A), which are orthogonal to one another. The module 200 includes a linear drive member 202 having a first portion 204 and a second portion 206. More specifically, in the exemplary embodiment of FIG. 4, the linear drive member 202 is a lead screw 202 that includes a first lead screw portion 204 and a second lead screw portion 206. The second lead screw portion has threads 210 opposite to threads 208 of the first lead screw portion 204. The first lead screw portion 204 and the second lead screw portion 206 are aligned with one another along a straight line SL. However, it should be appreciated that, in other embodiments, the linear drive member 202 may have other con-figurations and need not be a lead screw. For example, the linear drive member 202 may be a rod or the like that supports linear motion of components received thereon.

The module 200 further comprises at least one shuttle 212 that moves along a path defined by the linear drive member 202. In the exemplary embodiment of FIG. 4, module 200 includes two shuttles 212 in the form of a first nut assembly 212a threaded on the first lead screw portion 204 and a second nut assembly 212b threaded on the second lead screw portion 206. Each nut assembly 212 includes a gripper 216 and a clamping element 218 supported on a platform 220 (FIG. 5A), as well as a nut 222 for threading the nut assembly 212 onto the respective lead screw portion 204, 206. More particularly, the first nut assembly 212a includes a first gripper 216a and a first clamping element 218a supported on a first platform 220a that is carried on a first nut 222a. The second nut assembly 212b includes a second gripper 216b and a second clamping element 218b supported on a second platform 220b and carried on a second nut 222b. As with linear drive member 202, the nut assembly embodiment described herein is provided by way of example only, and it should be understood that each shuttle 212 may have other configurations as well.

Grippers 216 of module 200 are used to "grip" plies 100, e.g., to pick up plies 100 and hold on to plies 100 as the plies are handled, e.g., removed and/or moved from the sheet 104 of composite material. Each gripper 216 may be a vacuum gripper, suction or vacuum cup, needle gripper, adhesive gripper, electrostatic gripper, a plate surface with engravings, or other suitable device. Alternatively, module 200 may utilize a combination of types of grippers 216, e.g., the gripper 216a of first shuttle 212a may be different from the gripper 216b of second shuttle 212b. Additionally, each gripper 216 is not limited to a certain shape or a certain size, but the grippers 216 may have a custom shape and/or a custom size, and module 200 may utilize any combination of different shape and size grippers 216. For instance, each gripper 216 may have the same shape and size, each gripper 216 may have a different shape and size, or some grippers 216 may have the same shape and size. Moreover, although FIG. 4 illustrates each shuttle 212 having one gripper 216, other numbers and configurations of grippers 216 may be provided for each assembly 212.

Further, clamping elements 218 may be used, e.g., to hold down the skeleton or remaining material of the sheet 104 of composite material as plies 100 are removed by the module 200. That is, clamping elements 218 ensure each ply 100 is removed from the sheet 104 of composite material and that no "additional" composite material, i.e., no material other than the ply or plies 100 intended to be removed, is removed from the sheet 104. As such, each clamping element 218 may be positioned outside an edge or perimeter 101 of the ply 100 to hold down material other than the ply 100 that is being removed. Clamping elements 218, for example, may comprise cylinders 224 with extendable rods 226 as shown in FIG. 5A, where the rod 226 extends in a direction opposite a direction in which the module 200 removes ply 100 from the sheet 104 (e.g., the rod 226 extends in a direction opposite of a ply removal direction) such that the rod 226 keeps the skeleton from being removed with the ply 100. The rod 226 may retract when the ply 100 is removed from sheet 104, i.e., the clamping element 218 may extend opposite to the ply removal direction until the ply 100 is removed from the sheet 104. In other embodiments, clamping elements 218 may be any other suitable device for ensuring only the intended ply or plies 100 are removed from the sheet 104 of composite material. In some embodiments of module 200, a combination of clamping elements 218 may be used, e.g., the clamping element 218 of the first gripping or nut assembly 212a may be different from the clamping element 218 of the second gripping or nut assembly 212b.

As depicted in FIG. 4, the module 200 further includes an actuator 228, such as a servomotor, belt drive, lead screw actuator, ball screw actuator, planetary roller screw actuator, rack and pinion actuator, or the like, in operational communication with one or more components for adjusting the positions of the shuttles 212 with respect to one another. In the depicted embodiment, in which the linear drive member 202 is a lead screw, the actuator 228 is in operational communication with the lead screw. The actuator 228 rotates the first lead screw portion 204 and the second lead screw portion 206 of the lead screw 202 to adjust the position of the first nut assembly 212a and the second nut assembly 212b and thereby adjust the position of each gripper 216 and clamping element 218. In other embodiments, the actuator 228 may be in operational communication with each shuttle 212 to linearly actuate the assemblies 212 such that the gripper 216a and clamping element 218a of the first shuttle 212a moves with respect to the gripper 216b and clamping element 218b of the second shuttle 212b along the path of the linear drive member 202. More particularly, a processor 114, such as described above, may control the actuator 228 to adjust the position of each gripping or nut assembly 212 and thereby adapt the position of grippers 216 and clamping elements 218 according to a shape of a ply 100 for removing the ply 100 from a sheet 104 of composite material. For example, the processor 114 may send one or more signals to actuator 228 to move the first gripping or nut assembly 212a to position the first gripper 216a near a first portion 101a of an edge of ply 100 and to move the second gripping or nut assembly 212b to position the second gripper 216b near a second portion 101b of an edge of ply 100. The shuttles 212 may move linearly toward and away from one another when actuated, e.g., the first shuttle 212a may move along the first portion 204 of linear drive member 202 and the second shuttle 212b may move along the second portion 206 of linear drive member 202 such that the shuttles 212 move linearly toward and away from one another.

In some embodiments, the processor 114 may automatically control the position of the first shuttle 212a and the second shuttle 212b. For instance, referring to the embodiment of FIG. 4, a ply removal pattern may be pre-programmed such that processor 114 stores the positions of the first nut assembly 212a and the second nut assembly 212b for removing a first ply 100a, the positions of the first nut assembly 212a and the second nut assembly 212b for removing a second ply 100b, and so on for each ply 100 to be removed from a sheet 104 of composite material. Using the pre-programmed positions of the nut assemblies 212, the processor 114 can control the actuator 228 to reposition the nut assemblies 212 between when the module 200 releases one ply 100 and is positioned to pick up the next ply 100. In other embodiments, module 200 may include one or more sensors 229 that, e.g., sense and provide inputs to the processor 114 regarding the relative position of each gripper 216, clamping element 218, and/or the plies 100 cut in sheet 104. For example, a sensor 229 may be positioned on each platform 220, and each sensor 229 may provide inputs to processor 114 regarding the position of an associated gripper 216 with respect to an edge of a ply 100, the distance of an associated gripper 216 from a reference point, the shape of the ply, or the like. Suitable sensors 229 may include edge sensors, laser distance sensors, color sensors, optical sensors (such as cameras), or any other appropriate sensor. The processor 114 may then use the inputs from each sensor 229 to control the actuator 228 to reposition the nut assemblies 212 such that the position of each gripper 216 and clamping element 218 is adapted to a position for removing the ply 100 according to the ply shape. It will be appreciated that the processor 114 includes any appropriate memory device(s), sensor interface(s), subsystem(s), etc., such as a camera image processing subsystem or the like, for using the inputs from the one or more sensors 229 to control actuator 228.

Thus, the processor 114 may automatically control the gripping or nut assemblies 212 (e.g., by rotating the lead screw portions 204, 206 or linearly actuating the shuttles 212 as described) to reposition the grippers 216 for gripping the next ply 100 to be picked up. Such automatic control of the gripper 216 positions may help reduce the time required to remove plies 100 from a sheet 104 of composite material because, e.g., the processor can reposition the gripping or nut assemblies 212 (and thereby the grippers 216) for picking up the next ply 100 as the module is moving to pick up the next ply. Accordingly, by the time the module 200 is in place to pick up the next ply 100, the grippers 216 are in position to engage the next ply. In some embodiments, multiple ply removal patterns may be pre-programmed into the processor 114 or, alternatively, the positions of the gripping or nut assemblies 212 may be sent to the processor 114, e.g., by an operator or based on inputs from one or more sensors 229, substantially in real time.

The module 200 also comprises a frame 230. The frame 230 supports various features of the module 200, such as the linear drive member 202 and/or shuttles 212, illustrated as lead screw 202, first nut assembly 212a, and second nut assembly 212b in the exemplary embodiment. As illustrated in FIG. 4, the frame 230 may define a perimeter of the module 200, but in other embodiments, the frame 230 may have a different configuration, i.e., the frame 230 may not extend about or define the perimeter of the module 200. The frame 230 may have any suitable shape, e.g., a square, rectangular, or other polygonal or appropriate shape, for supporting and/or providing an attachment structure for the various components of the module 200.

As shown in FIGS. 3 and 4, the ply manipulation tool module 200 is attached to a robotic arm 112 of the automated machine 102 via a flange 116. For example, the frame 230 of the module 200 may be coupled to the flange 116 to attach the module 200 to the robotic arm 112. The flange 116 allows the module 200 to rotate about the robotic arm 112. That is, a processor 114 of the automated machine 102 may send one or more signals to an actuator 228 to control the angular position of the module 200 with respect to the robotic arm 112 by varying the position of the flange 116. For example, the flange 116 may rotate with respect to the arm 112, thereby changing the angular position of the module 200, which is attached to the flange 116, with respect to the arm 112. Moreover, the robotic arm 112 may control the longitudinal, lateral, and vertical location or position of the ply manipulation tool module 200 with respect to the sheet 104 of composite material and the plies 100 to be removed from the sheet 104. As described above, the processor 114 may automatically control the actuator 228 to reposition the module 200 with respect to the robotic arm according to a pre-programmed ply removal pattern. In other embodiments, one or more sensors 229 may be provided such that processor 114 may automatically control the actuator 228 to reposition or adapt the position of module 200 according to one or more inputs from the sensor(s) 229, e.g., substantially in real time.

Turning to FIG. 5B, in some embodiments, the sheet 104 of composite material is positioned on a cutting table 106 that places a vacuum on the sheet 104 to hold the sheet in place on the table. As such, a vacuum seal may be formed between the cutting table 106 and plies 100 cut from the sheet 104 of composite material, which may increase the difficulty of removing the plies 100 from the sheet 104 and away from the cutting table 106. More particularly, the vacuum applied to the sheet 104 may remain on as a ply 100 is removed from the sheet, e.g., to hold the sheet 104 and/or remaining plies 100 in place on the table 106, and the vacuum may be a relatively strong down force on the sheet 104 and plies 100 cut from the sheet. Thus, to remove the plies 100, the vacuum seal between the table 106 and the ply or plies 100 being removed from the table may need to be released before attempting to remove the plies 100 from the table 106. For example, in some embodiments, the vacuum seal may be such that about 400N or more of vertical force may be required to lift a ply straight up from the cutting table 106, which may unduly strain the module 200 and/or robotic arm 104. Therefore, releasing the vacuum seal may be desirable to avoid damage to the module 200, robotic arm 112, and/or plies 100.

Accordingly, in some embodiments, the module 200 may utilize tilting grippers 232 to help break the vacuum seal and thereby reduce the amount of vertical force required to lift a ply 100 off of the cutting table 106 and remove the ply 100 from the sheet 104 of composite material, while the vacuum force holds the remaining sheet material and/or plies 100 in place on the table. As shown in FIG. 5B, the first nut assembly 212a of module 200 includes a tilting gripper assembly 232 that comprises a cylinder 234, linkage system 236, and gripper 216. In the illustrated exemplary embodiment, the linkage system 236 includes an extendable rod 238 that extends from and retracts into the cylinder 234; a main link 240; and a pivot link 242. The main link 240 connects to the rod 238 at a first joint $J_1$, the pivot link 242 connects to the main link 240 at a joint $J_2$, and the cylinder connects to the nut assembly 212a at a third joint $J_3$. It should be understood that the tilting gripper assembly 232 may be used with other forms of shuttles 212 and not solely with the nut assemblies 212 of the illustrated embodiment.

As shown in FIG. 5B, when the gripper 216 of tilting gripper assembly 232 is brought down into contact with a ply 100, the linkage system 236 is arranged such that the gripper 216 is brought down vertically or straight onto the ply 100. That is, the main link 240 and the pivot link 242 of the linkage system 236 are generally vertical, or aligned generally along the vertical direction V, as the gripper 216 is brought into contact with the ply to grip the ply. To release the vacuum seal between the ply 100 and the cutting table 106, the rod 238 is retracted into the cylinder 234, which tilts the main link 240 toward the cylinder 234. Referring to FIG. 5C, as the main link 240 tilts toward the cylinder 234, the main link 240 pulls the pivot link 242 in the direction of the main link 240, which pulls the gripper 216 in the direction of the main link 240, i.e., the tilting pivot link 242 tilts the gripper 216 toward the cylinder 234. As such, an edge 246 of the gripper 216 farthest from the cylinder 234 lifts vertically upward from the table 106, thereby lifting the ply 100 away from the table and releasing the vacuum seal between the ply 100 and the cutting table 106, as depicted in FIG. 5C. After the vacuum seal is released, the module 200 may move slightly vertically, and the rod 238 may be extended from the cylinder 234 to return the main link 240, pivot link 242, and gripper 216 to a vertical position to remove the ply 100 from the sheet 104 and away from the cutting table 106.

By releasing the vacuum seal before removing the ply 100 from the sheet 104 of composite material and away from the cutting table 106, the vertical force required to lift the ply 100 away from the cutting table 106 may be reduced to, e.g., as little as about 10N. Thus, releasing the vacuum seal before vertically lifting the ply 100 can greatly reduce the amount of vertical force required to remove the ply 100 from the sheet 104 of composite material and the cutting table 106. In some embodiments, a combination of non-tilting grippers 216 and tilting grippers or gripper assemblies 232 may be used in module 200, i.e., some grippers 216 of the module 200 may be in a fixed position while other grippers 216 may be part of a tilting gripper assembly 232 and thus able to tilt or pivot relative to the vertical direction V. In other embodiments, each gripper 216 of module 200 is part of a gripper assembly 232, i.e., each gripper of the module is a tilting gripper that tilts or pivots relative to the vertical direction V.

Moreover, in some embodiments, multiple or a plurality of clamping elements 218 may be provided on a shuttle 212 of the module 200. More particularly, more than one clamping element 218 may be supported on a platform 220 of a shuttle 212. As shown in the exemplary embodiment of FIG. 5D, the first platform 220a of the first nut assembly 212a may protrude from one side of the first lead screw portion 204, on which the first platform 220a is received, i.e., the first platform 220a may not be centered on the lead screw portion. In such embodiments, a platform guiding rod 244 may be provided, e.g., to help support platform 220 and/or to help guide the platform 220 as the nut assembly 212 is positioned for gripping a ply 100 and clamping down the remaining sheet 104 of composite material. As illustrated in FIG. 5D, a first platform guiding rod 244a may extend generally parallel to the first lead screw portion 204 for guiding and/or supporting first platform 220a. That is, as the first lead screw portion 204 is rotated as shown by the arrow S, the first platform 220a of first nut assembly 212a may translate along the first lead screw portion 204 and the first platform guiding rod 244a as shown by the arrow N. It will be appreciated that a platform guiding rod 244 may be provided for each platform 220 of module 200, e.g., a second platform guiding rod 244b may extend generally parallel to the second lead screw portion 206 for guiding and/or supporting second platform 220b.

In some embodiments, each of the clamping elements 218 may be individually controlled such that the clamping elements 218 may be selectively utilized in removing plies 100 from the sheet 104 of composite material. That is, not every clamping element 218 need be used to remove a particular ply 100 from the sheet. For example, to remove a narrow ply 100, one or more clamping elements 218 may be used to hold down the composite material remaining in the sheet 104, e.g., on either side of the narrow ply. Multiple clamping elements 218 also can help hold down the composite material skeleton where the ply 100 to be removed has a sharp or tight corner.

As stated, each of the plurality of clamping elements 218 of a gripping or nut assembly 212 may be selectively activated such that an appropriate number of clamping elements 218 is used for a particular ply configuration. For example, in the exemplary embodiment depicted in FIG. 5D, the module 200 comprises a first nut assembly 212a with three clamping elements 218 arranged in a generally triangular configuration. To remove a first ply 100a, all three clamping elements 218 may be required to hold down the sheet 104 of composite material as the ply 100 is removed; accordingly, all three clamping elements 218 are activated to hold down the sheet. However, the next ply 100b removed by the module 200 may have a different configuration such that only one of the clamping elements 218 of the first nut assembly 212a is required to hold down the composite skeleton on the cutting table 106. Thus, only the one clamping element 218 is activated to hold down the remaining composite material. In other embodiments, the platform 220 may support any suitable number of clamping elements 218, and the clamping elements 218 may be arranged in any suitable configuration. For example, for a module 200 having two clamping elements 218, one clamping element 218 may be positioned adjacent one side of the platform 220 and the other clamping element 218 may be positioned adjacent an opposite side of the platform 220; the two clamping elements 218 also may be offset from one another such that one clamping element is not directly opposite the other clamping element. As another example, for a module 200 having four clamping elements 218, the clamping elements 218 may be arranged in a generally rectangular configuration. Of course, other numbers and/or configurations of clamping elements 218 may be used in other embodiments.

In still other embodiments, the module 200 may be able to adapt the position of grippers 216 for removing plies 100 from or moving plies 100 to an uneven surface. Referring to FIG. 3, as described above, module 200 may be used to remove plies 100 from a generally planar sheet 104 of composite material. Turning to FIG. 5E, module 200 also may be configured to lay up plies 100 on a layup tool 120 having an uneven layup surface. Further, module 200 may remove plies 100 from a non-planar sheet 104 or from non-planar stack of plies 100, or module 200 may move plies 100 to a non-planar ply stack. To accommodate handling plies 100 with respect to such uneven or non-planar surfaces, module 200 may include a pivot element 248 that supports pivoting each linear drive member portion 204, 206 with respect to the vertical direction V. As shown in the exemplary embodiment of FIGS. 5E and 5F, the pivot element 248 may pivot a first portion 248a about a hinge point $P_H$ to vary the position of first lead screw portion 204, and thereby the position of first gripper 216a, with respect to the vertical direction V. The pivot element 248 may pivot a second portion 248b about the hinge point $P_H$ to vary the position of second lead screw portion 206, and thereby the position of second gripper 216b, with respect to the vertical direction V. It will be appreciated that the figure on the left in both FIG. 5E and FIG. 5F depicts the grippers 216 in a substantially linear position, while the figure on the left in both FIG. 5E and FIG. 5F depicts the grippers in a non-linear position.

Moreover, as shown in FIG. 5E, a guide element 247 may be provided on a linear drive member 205 oriented perpendicularly to linear drive member portions 204, 206. A guide line 249a extends from guide element 247 to an end of the first linear drive member 204 opposite the pivot element 248. Similarly, a guide line 249b extends from guide element 247 to an end of the second linear drive member 206 opposite the pivot element 248. An actuator 228 may actuate the guide element 247 such that the guide element 247 travels along the linear drive member 205, and the motion of the guide element 247 actuates the pivot element 248 to pivot the linear drive member portions 204, 206. The guide lines 249a, 249b may help support the linear drive member portions 204, 206 and help facilitate pivoting of the linear drive member portions 204, 206 about the hinge point $P_H$. The pivot element 248 may be, e.g., a gear assembly or the like. In other embodiments, other configurations of module 200 may be used to adjust the positions of grippers 216 to pick up plies 100 from or move plies 100 to uneven or non-planar surfaces.

Additionally, the ply manipulation tool module 200 includes features for releasing ply 100 that is gripped by grippers 216 from the grippers 216. For instance, one or more mechanical devices may separate the ply 100 from the module 200. The mechanical device or devices may be a part of module 200 or may be separate from the module. In other embodiments, pressurized air or other non-mechanical means may be used to release the ply 100 from the module 200. Further, in embodiments in which the ply 100 is gripped by one or more vacuum grippers 216, a vacuum release valve may be included to release the vacuum of the gripper(s) 216.

The ability of the shuttles 212 to move relative to one another also provides a means of releasing the ply 100 from the ply manipulation module 200. For example, once the ply 100 has been removed from sheet 104 and moved to a suitable location, such as ply storage area 108 or play layup area 110, the shuttles 212 can be moved toward one another to facilitate the release of the ply 100 from the grippers 216 of the shuttles 212. In some embodiments, only one shuttle 212 may be moved toward the other shuttle 212, or the shuttles 212 may be moved in other ways relative to one another to release the ply 100 from the grippers 216. The ply manipulation module 200 also may include other features for releasing the ply 100, or whatever component is gripped by the module 200, from the module 200.

It will be appreciated that the embodiments of module 200 described above may adapt to a variety ply shapes and/or size. As such, module 200 is not limited to removing and/or moving plies 100 having only one shape and/or size. When used with a machine such as automated machine 102 having a robotic arm 112 and a processor 114, the module 200 may be referred to as a "smart" end-effector, as the module 200 is, e.g., programmable to automatically adapt to various ply configurations.

Turning to FIG. 6A, a top view is provided of a ply manipulation tool assembly 250 according to an exemplary embodiment of the present subject matter. The assembly 250 defines a longitudinal direction $L_A$, a transverse direction $T_A$, and a vertical direction $V_A$, which are orthogonal to one another. As shown in FIG. 6A, in some embodiments, a ply manipulation tool assembly 250 used with an automated machine 102 may utilize multiple modules 200. More particularly, the illustrated ply manipulation tool assembly 250 includes a first module 200a and a second module 200b. Each of the first and second modules 200a, 200b may include the various elements described above with respect to the exemplary embodiments of module 200 shown in FIG. 4 and FIGS. 5A through 5F.

More specifically, referring to FIG. 6B, the first module 200a includes a linear drive member 202 having a first portion 204 and a second portion 206, which are shown and described with respect to the exemplary embodiment of first module 200a as a lead screw 202 including a first lead screw portion 204 and a second lead screw portion 206. The second lead screw portion 206 of the first module 200a has threads 210 opposite to threads 208 of the first lead screw portion 204 of the first module 200a. The first lead screw portion 204 and the second lead screw portion 206 of the lead screw 202 of the first module 200a are aligned with one another along a straight line $SL_1$. The first module 200a further includes a first shuttle 212a, embodied as a first nut assembly 212a including a first gripper 216a and a first clamping element 218a supported on a first platform 220a carried on a first nut 222a. The first module 200a also includes a second shuttle 212b, embodied as a second nut assembly 212b including a second gripper 216b and a second clamping element 218b supported on a second platform 220b and carried on a second nut 222b. The first nut 222a of the first nut assembly 212a of the first module 200a is threaded on the first lead screw portion 204 of the first module 200a, and the second nut 222b of the second nut assembly 212b is threaded on the second lead screw portion 206 of the first module 200a. As such, the first nut assembly 212a is received on the first lead screw portion 204 of the first module 200a, and the second nut assembly 212b is received on the second lead screw portion 206 of the first module 200a. The nut assemblies 212 of the first module 200a may linearly move along the respective lead screw portion 204, 206 to position each gripper 216 and clamping element 218 in a position for removing a ply 100 from a sheet 104 of composite material.

Similarly, as illustrated in FIG. 6C, the second module 200b includes a linear drive member 202 having a first portion 204 and a second portion 206, which are shown and described with respect to the exemplary embodiment of second module 200b as a lead screw 202 including a first lead screw portion 204 and a second lead screw portion 206. The second lead screw portion 206 of the second module 200b has threads 210 opposite to threads 208 of the first lead screw portion 204 of the second module 200b. The first lead screw portion 204 and the second lead screw portion 206 of the lead screw 202 of the second module 200b are aligned with one another along a straight line SL$_2$. The second module 200b further includes a first shuttle 212a, embodied as a first nut assembly 212a including a first gripper 216a and a first clamping element 218a supported on a first platform 220a that is carried on a first nut 222a. The second module 200b also includes a second shuttle 212b, embodied as a second nut assembly 212b including a second gripper 216b and a second clamping element 218b supported on a second platform 220b that is carried on a second nut 222b. The first nut assembly 212a is received on the first lead screw portion 204 of the second module 200b, and the second nut assembly 212b is received on the second lead screw portion 206 of the second module 200b. The nut assemblies 212 of the second module 200b may translate along the respective lead screw portion 204, 206 to position the gripper 216 and clamping element 218 of each nut assembly 212 in a position for removing a ply 100 from a sheet 104 of composite material.

Referring back to FIG. 6A, the first and second modules 200a, 200b are received on a longitudinal linear drive member 252, having a first longitudinal portion 254 and a second longitudinal portion 256. In the exemplary embodiment, the longitudinal linear drive member 252 is a longitudinal lead screw 252 that includes a first longitudinal lead screw portion 254 and a second longitudinal lead screw portion 256. The second longitudinal lead screw portion 256 has threads 260 opposite to threads 258 of the first longitudinal lead screw portion 254. The first longitudinal lead screw portion 254 and the second longitudinal lead screw portion 256 are aligned with one another along a straight line SL$_3$.

The ply manipulation tool assembly 250 further comprises a longitudinal coupling assembly 262 for coupling each module 200 to the longitudinal linear drive member 252 such that the modules 200 may move along a path defined by the longitudinal linear drive member 252. In the exemplary embodiment of FIG. 6A, each longitudinal coupling assembly 262 is a longitudinal nut assembly 262, and a first longitudinal nut assembly 262a couples the first module 200a to the longitudinal lead screw 252 and a second longitudinal nut assembly 262b couples the second module 200b to the longitudinal lead screw 252. Each longitudinal nut assembly 262 includes a platform 264 and a nut 266. Each platform 264 supports and/or carries the components of the respective longitudinal nut assembly 262. Each nut 266 is threaded on a longitudinal lead screw portion 254, 256 to couple the first module 200a and the second module 200b to the longitudinal lead screw 252. More particularly, the first longitudinal nut assembly 262a includes a first nut 266a that is carried by a first platform 264a and is threaded on the first longitudinal lead screw portion 254 to couple the first module 200a to the longitudinal lead screw 252. Similarly, the second longitudinal nut assembly 262b includes a second nut 266b that is carried by a second platform 264b and is threaded on the second longitudinal lead screw portion 256 to couple the second module 200b to the longitudinal lead screw 252.

Further, each longitudinal coupling assembly 262 includes a pivot flange 268 supported by the platform 264 such that each module 200 may pivot with respect to the longitudinal linear drive member 252. In the depicted embodiment, the first longitudinal nut assembly 262a includes a first pivot flange 268a that enables the first module 200a to pivot relative to the first longitudinal lead screw portion 254. The second longitudinal nut assembly 262b includes a second pivot flange 268b that enables the second module 200b to pivot relative to the second longitudinal lead screw portion 256. Accordingly, each of the first module 200a and the second module 200b are pivotable relative to the longitudinal linear drive member 252, depicted as a longitudinal lead screw 252 in the exemplary embodiment of FIGS. 6A, 6B, and 6C.

As with the ply manipulation tool module 200 described above, the lead screw and nut assembly embodiment described with respect to FIGS. 6A to 6C is provided by way of example only. It should be understood that the longitudinal linear drive member 252 and each longitudinal coupling assembly 262 may have other configurations as well. Further, the linear drive member 202 and shuttles 212 of each module 200 of the ply manipulation tool assembly 250 need not be configured as a lead screw and nut assemblies, respectively, but may have other appropriate configurations for adapting the positions of the grippers 216 and clamping elements 218 according to the shape of a ply 100.

It will be appreciated that the ply manipulation tool assembly 250 may include a plurality of actuators 228 that, e.g., control the movement of the shuttles 212 of each module 200, as well as the movement of each of the longitudinal coupling assemblies 262. In the exemplary embodiment depicted in FIG. 6A, five actuators 228 are provided. First, one actuator 228a controls the movement of first and second longitudinal nut assemblies 262a, 262b on the longitudinal lead screw 252, e.g., by rotating each longitudinal lead screw portion 254, 256. Second, one actuator 228b controls the movement of nut assemblies 212 of the first module 200a on the lead screw 202 of the first module 200a, e.g., by rotating each lead screw portion 204, 206 of the first module 200a. Third, one actuator 228c controls the pivotable movement of the first module 220a relative to the longitudinal lead screw 252, e.g., by changing an angular position of the first pivot flange 268a with respect to the longitudinal lead screw 252. Fourth, one actuator 228 controls the movement of nut assemblies 212 of the second module 200*b* on the lead screw 202 of the second module 200*b*, e.g., by rotating each lead screw portion 204, 206 of the second module 200*b*. And fifth, one actuator 228 controls the pivotable movement of the second module 200*b* relative to the longitudinal lead screw 252, e.g., by changing an angular position of the second pivot flange 268*b* with respect to the longitudinal lead screw 252.

In some embodiments, one actuator 228 may be capable of controlling multiple movements; for example, an appropriate actuator 228 may control both the linear movement of the shuttles 212 of the first module 200*a*, as well as the pivotable movement of the first module 200*a* relative to the longitudinal linear drive member 252. Further, it will be understood that a suitable number of actuators 228 may be provided to control the movement of the various elements of the ply manipulation tool assembly 250. For example, if the assembly 250 includes three modules 200 rather than two modules 200, an appropriate number of actuators 228 should be provided to control the movement of each movable element of the three modules 200, as well as the movement of the three modules 200 relative to the longitudinal lead screw 252. Moreover, an appropriate type of actuator 228, such as a servomotor, belt drive, lead screw actuator, ball screw actuator, planetary roller screw actuator, rotary actuator, rack and pinion actuator, etc., may be used for each of the multiple movements. In some embodiments, one type of actuator 228, such as a servomotor or the like, may be able to produce each of the required movements such that each actuator 228 of ply manipulation tool assembly 250 is of the same type. However, in other embodiments, an appropriate combination of types of actuators 228 may be used.

Moreover, similar to the ply manipulation tool module 200 described above, the ply manipulation tool assembly 250 comprises at least one processor 114 to control the actuators 228 to adjust the position of each longitudinal coupling assembly 262, as well as the position of each module 200, and thereby position grippers 216 and clamping elements 218 in proper positions for removing a ply 100 from a sheet 104 of composite material. In some embodiments, one processor 114 may be utilized to control the one or more actuators 228 of the ply manipulation tool assembly 250. In other embodiments, a plurality of processors 114 may be provided to control the actuators of the assembly 250. As previously described, the one or more processors 114 may automatically control the positions of the shuttles 212 of the modules 200, as well as the positions of the modules 200 with respect to the longitudinal linear drive member 252. For instance, a ply removal pattern may be pre-programmed such that processor(s) 114 store the positions of the longitudinal coupling assemblies 262 and the shuttles 212 of the first and second modules 200*a*, 200*b* for removing a first ply 100*a*, the positions of the assemblies 212, 262 for removing a second ply 100*b*, and so on for each ply 100 to be removed from a sheet 104 of composite material. In other embodiments, one or more sensors 229 may be provided such that processor 114 may automatically control the actuator(s) 228 to reposition or adapt the position of assemblies 212, 262 according to one or more inputs from the sensor(s) 229, e.g., substantially in real time. Thus, the processor(s) 114 may automatically control the assemblies 212, 262 to reposition the grippers 216 for gripping the next ply 100 to be removed, which may, e.g., help reduce the time required to remove plies 100 from a sheet 104 of composite material. In some embodiments, multiple ply removal patterns may be pre-programmed into the processor(s) 114 or, alternatively, the positions of the assemblies 212, 262 may be sent to the processor(s) 114, e.g., by an operator or based on inputs from one or more sensors 229, substantially in real time.

As illustrated in FIG. 6A, a frame 270 supports various elements of the ply manipulation tool assembly 250. Similar to the frame 230 of the module 200 illustrated in FIG. 4, the frame 270 of the assembly 250 may define a perimeter of the assembly 250, but in other embodiments, the frame 270 may have a different configuration, i.e., the frame 270 may not extend about or define the perimeter of the ply manipulation tool assembly 250. It will be appreciated that the frame 270 may have any suitable shape, e.g., a square, rectangular, or other polygonal or appropriate shape, for supporting and/or providing an attachment structure for the various components of the assembly 250.

Further, as shown in FIG. 6A, the frame 270 of the ply manipulation tool assembly 250 may be coupled to a robotic arm 112 of the automated machine 102 via a flange 116, thereby attaching the assembly 250 to the robotic arm 112. The flange 116 allows the ply manipulation tool assembly 250 to rotate about the robotic arm 112. That is, a processor 114 of the automated machine 102 may send one or more signals to an actuator 228 to control the angular position of the assembly 250 with respect to the robotic arm 112 by varying the position of the flange 116. For example, the flange 116 may rotate with respect to the arm 112, thereby changing the angular position of the assembly 250, which is attached to the flange 116, with respect to the arm 112. Moreover, the robotic arm 112 may control the longitudinal, lateral, and vertical position or location of the ply manipulation tool assembly 250 with respect to the sheet 104 of composite material and the plies 100 to be removed from the sheet 104.

Some embodiments of ply manipulation tool assembly 250 may utilize clamping elements 218 comprising a cylinder 224 and extendable rod 226, as described with respect to FIG. 5A, where the extendable rod extends as the assembly 250 is lifted vertically to hold the remaining composite material in place such that only the ply 100 gripped by the grippers 216 is removed from the cutting table 106. Further, in some embodiments, the shuttles 212 of the modules 200 of assembly 250 may utilize tilting gripper assemblies 232 as described above with respect to FIGS. 5B and 5C. That is, one or more of the grippers 216 of the shuttles 212 of first module 200*a* and/or one or more of the grippers 216 of the shuttles 212 of second module 200*b* may tilt to release a vacuum seal between the ply 100 being removed from a sheet 104 of composite material and the cutting table 106 on which the sheet 104 is laid to cut ply shapes into the sheet 104. More particularly, as previously described, each tilting gripper assembly 232 may comprise a cylinder 234, linkage system 236, and gripper 216. In exemplary embodiments, the linkage system 236 includes an extendable rod 238 that extends from and retracts into the cylinder 234; a main link 240; and a pivot link 242. The main link 240 connects to the rod 238 at a first joint $J_1$, the pivot link 242 connects to the main link 240 at a joint $J_2$, and the cylinder 234 connects to the nut assembly 212 at a third joint $J_3$. After the gripper is brought into contact with a ply 100, the rod 238 may be retracted into the cylinder 234 to tilt the main link 240 toward the cylinder 234. As the main link 240 tilts toward the cylinder 234, the main link 240 pulls the pivot link 242 in the direction of the main link 240, which pulls the gripper 216 in the direction of the main link 240, i.e., the tilting pivot link 242 tilts the gripper 216 away from the vertical direction V and toward the cylinder 234. The edge 246 of gripper 216 farthest from cylinder 234 lifts away from the cutting table 106, thereby lifting the ply 100 to release the vacuum seal between the ply 100 and the cutting table 106, as depicted in FIG. 5C. After the vacuum seal is released, the rod 238 may be extended from the cylinder 234 to return the main link 240, pivot link 242, and gripper 216 to a vertical position to fully remove the ply 100 from the sheet 104 and away from the cutting table 106. Before returning the gripper 216 to the vertical position, the tool assembly 250 may be lifted vertically away from table 106 such that the downward force of the vacuum is not reapplied to the ply 100.

As previously described, releasing the vacuum seal before attempting to remove the ply 100 from the sheet 104 of composite material and away from the cutting table 106 can greatly reduce the vertical force required to lift the ply 100 away from the cutting table 106. It will be appreciated that, in some embodiments, the ply manipulation tool assembly 250 may utilize a combination of non-tilting grippers 216 and tilting grippers or gripper assemblies 232, i.e., some grippers 216 of the modules 200 may be in a fixed position while other grippers 216 may be part of a tilting gripper assembly 232 and, thus, may be able to tilt or pivot relative to the vertical direction V. In other embodiments, each gripper 216 of the ply manipulation tool assembly 250 is part of a gripper assembly 232, i.e., each gripper 216 of the modules 200 is a tilting gripper that tilts or pivots relative to the vertical direction V.

Further, as described in greater detail above and illustrated in FIG. 5D, in some embodiments, multiple clamping elements 218 or a plurality of clamping elements 218 may be provided on one or more of the shuttles 212 of the modules 200 of assembly 250. As previously described, more than one clamping element 218 may be supported on a platform 220 of a shuttle 212, and a platform guiding rod 244 may be provided to guide and/or support the platform 220. In some embodiments, each of the clamping elements 218 may be individually controlled such that the clamping elements 218 may be selectively utilized in removing plies 100 from the sheet 104 of composite material. Each of the plurality of clamping elements 218 of a shuttle 212 may be selectively activated such that an appropriate number of clamping elements 218 is used for removing each ply 100.

Moreover, as described with respect to FIGS. 5E and 5F, the modules 200 of ply manipulation tool assembly 250 may be able to adapt the position of grippers 216 for removing plies 100 from or moving plies 100 to an uneven surface. For example, one or more modules 200 of assembly 250 may include a hinged frame 246 such that the positions of grippers may pivot with respect to the vertical direction V and thereby adapt to the contour of a ply 100 positioned on an uneven surface or to adapt the contour of the ply 100 for positioning on an uneven surface. As another example, one or more modules 200 of assembly 250 may include vertical positioning assemblies 248 for varying the vertical position of each gripper 216. Each vertical positioning assembly 248 may include a cylinder 234 and extendable rod 238 arranged to vary the vertical position of a gripper 216 as the rod 238 extends and retracts. Further, the gripper 216 may be pivotally attached to the rod 238 of the assembly 248 such that the gripper 216 may pivot about the rod 238 to adjust to the contour of the ply 100 on which the gripper 216 is positioned. Accordingly, modules 200 may be able to adjust the positions of grippers 216 to pick up plies 100 from or move plies 100 to uneven surfaces.

Additionally, as previously described with respect to ply manipulation tool module 200, the ply manipulation tool assembly 250 may include or be used with one or more features for releasing the ply or plies gripped by the assembly 250 from the assembly. Mechanical or non-mechanical means for releasing the ply or plies as described with respect to module 200 may be used to release the ply or plies from assembly 250. For instance, the modules 200 of ply manipulation tool assembly 250 may move relative to one another to release a ply gripped by the modules 200, or the shuttles of a module 200 of the assembly 250 may move relative to one another to release a ply gripped by the module 200 or the assembly 250. As another example, in embodiments utilizing one or more vacuum grippers 216, a vacuum release valve may be included to release the vacuum applied by the gripper(s) 216 to grip the ply or plies. Other means for releasing the component or components gripped by the ply manipulation tool assembly 250 may be used as well.

Although illustrated in FIG. 6A with two modules 200, the ply manipulation tool assembly 250 may have any suitable number of modules 200. For example, a ply manipulation tool assembly 250 may comprise a single module 200, i.e., one module 200 may be received on a longitudinal linear drive member 252. In other embodiments, an assembly 250 may comprise two, three, four, or more modules 200. A single frame 270 may support every module 200 of the assembly 250, or the assembly 250 may comprise multiple frames 270 to support the modules 200 of the assembly 250. Alternatively or additionally, a module frame 230 may be included with some or all of the modules 200 of assembly 250 to help support the various elements of the assembly 250.

FIG. 6D provides a top view of an exemplary embodiment of the present subject matter in which multiple ply manipulation tool assemblies 250 are connected to a robotic arm 112 via a flange 116. More particularly, in the embodiment of FIG. 6D, two ply manipulation tool assemblies 250 are each connected to a connector 272. The connector 272 is coupled to the flange 116 to attach the assemblies 250 to the robotic arm 112 of automated machine 102. In other embodiments, any suitable number of ply manipulation tool assemblies 250 may be connected to connector 272, which in turn is coupled to a flange 116 to attach the assemblies to an automated machine 102. As described above, flange 116 allows the angular position of the assemblies 250 to vary with respect to the arm 112, e.g., processor 116 may send one or more signals to vary the position of flange 116, thereby altering the position of the attached assemblies 250 with respect to the arm 112.

A ply manipulation tool assembly 250 comprising multiple modules 200 may be helpful in removing complex shaped plies 100 from a sheet 104 of composite material and/or in moving such plies 100. For instance, some plies 100 used in forming a composite preform may be relatively long and/or wide or may have a shape that includes one or more bends, curves, and/or angles. Further, the same assembly 250 may be used to remove and/or move plies 100 having a variety of shapes, i.e., at least one ply 100 removed and/or moved by assembly 250 may not have the same shape as other plies 100 removed and/or moved by the assembly. As such, the grippers 216 of assembly 250 preferably may be positioned in a multitude of configurations to adapt to a variety of ply shapes. Moreover, one ply manipulation tool assembly 250 may be used to remove and/or move more than one ply 100 at a time. For example, the grippers 216 may be positionable to simultaneously remove two or more separate plies 100 from a sheet 104 of composite material and move the plies 100 to a suitable location. Accordingly, an assembly 250 having a plurality of modules 200 may be adaptable to a variety of ply shapes as well as to simultaneously picking up multiple, separate plies 100.

Referring now to FIG. 7, in some embodiments, a ply manipulation tool module 200 may be attached to a robotic arm 112 and another ply manipulation tool module 200 may be attached to another robotic arm 112, and together, the tool modules 200 attached to the separate robotic arms 112 may pick up a single ply 100. For instance, as shown in the exemplary embodiment of FIG. 7, a first ply manipulation tool module 200a is attached to a first robotic arm 112a at a first flange 116a, and a second ply manipulation tool module 200b is attached to a second robotic arm 112b at a second flange 116b. Each robotic arm 112 may be independently controlled such that, e.g., the position of the first module 200a with respect to the sheet 104 may be independent of the position of the second module 200b with respect to the sheet 104. Further, the angular position of the linear drive member 202 of each module 200 may be independently controlled, i.e., the angular position of the linear drive member 202 of the first module 200a may be different from the angular position of the linear drive member 202 of the second module 200b. It will be appreciated that, in other embodiments, more than two robotic arms 112, each arm 112 having one or more ply manipulation tool modules 200 attached to the arm, may be used. Moreover, it will be understood that the two or more robotic arms 112 may be part of a single automated machine 102 or one or more of the multiple robotic arms 112 may be a component of a separate machine 102, e.g., in the embodiment of FIG. 7, each arm 112 may be part of a separate automated machine 102.

Using multiple or a plurality of robotic arms 112, each arm 112 having a ply manipulation tool module 200, may be particularly useful for removing relatively long composite plies 100 from a sheet 104 of composite material. As an example, as a ply 100 greater than about 100 cm in length is moved, the air resistance on the ply may be such that control over the ply may be lost, which could damage the ply. By using modules 200 on independent robotic arms 112, tension may be applied to the ply 100 to keep control over the ply, i.e., to ensure the stability of the ply as it is moved. For example, the ply 100 may be vertically lifted by modules 200 and then robotic arms 112 may slightly separate from one another to hold the ply 100 in the tension. Once in tension, the ply 100 may be more easily handled than a ply not held in tension, which can help in moving or otherwise handling the ply as described above.

Of course, utilizing multiple robotic arms 112 may be helpful in other situations as well. For example, as shown in FIG. 8, a ply manipulation system 280 may comprise a plurality of robotic arms 112, each robotic arm 112 having a ply manipulation tool assembly 250 with multiple modules 200 attached to the arm via a flange 116. As such, the ply manipulation system 280 provides a plurality of grippers 216 that are positionable in a plurality of locations. More particularly, because each ply manipulation tool assembly 250 is rotatable about the robotic arm 112 to which the assembly 250 is attached, and the robotic arm 112 can vary the longitudinal, lateral, and vertical location or position of each assembly 250 with respect to the sheet 104 of composite material, the ply manipulation system 280 can adapt its grippers 216 to any of a variety of ply shapes and/or sizes. For example, the ply manipulation system 280 can position its grippers 216 for removal of a ply 100 having a complex shape (e.g., a ply with a sharp bend, a ply with multiple bends, etc.), a relatively long ply 100 (e.g., greater than about 70 cm long), a relatively wide ply 100 (e.g., greater than about 10 cm wide), or the like. In addition, as described above, the ability to move or reposition the grippers 216 relative to one another can assist in releasing a ply 100, or other component gripped by the ply manipulation system 280, from the ply manipulation system 280, although the system 280 may include other features for releasing the ply 100 or other component from the system.

In other embodiments, such as the embodiment illustrated in FIG. 9, the ply manipulation system 280 may comprise a plurality of robotic arms 112 and each robotic arm 112 includes a plurality of ply manipulation tool assemblies 250 attached to the arm via a flange 116. For example, as depicted in FIG. 9, the ply manipulation system 280 may include a first robotic arm 112a having a first flange 116a to which is attached two ply manipulation tool assemblies 250. The system 280 also may include a second robotic arm 112b having a second flange 116b to which is attached two ply manipulation tool assemblies 250. Similar to the ply manipulation system 280 described with respect to FIG. 8, a system 280 comprising a plurality of ply manipulation tool assemblies 250 attached to a plurality of robotic arms 112 may be useful for manipulating plies 100 having complex shapes and/or for manipulating plies 100 that are relatively large in size.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A ply manipulation system, comprising:
   an automated machine having an arm;
   a ply manipulation tool assembly attached to the arm of the automated machine, the ply manipulation tool assembly including a first ply manipulation tool module that comprises
     a first shuttle including a first gripper and a first clamping element, the first clamping element linearly spaced apart from the first gripper,
     a second shuttle including a second gripper and a second clamping element, the second clamping element linearly spaced apart from the second gripper, and
     an actuator; and
   a processor that automatically controls the first clamping element and the second clamping element and that automatically controls the actuator to move the first and second shuttles linearly with respect to one another to adapt the first and second grippers to a ply shape and to move each clamping element to a position to be deployed outside a perimeter of a ply being removed from a sheet of material such that the clamping elements do not contact the ply,
   wherein each of the first and second clamping elements includes a member that is extendable in a direction opposite to a ply removal direction to hold down material other than the ply, and
   wherein each of the first and second clamping elements is individually controlled such that the member of each clamping element is selectively deployed in the direction opposite the ply removal direction.

2. The ply manipulation system of claim 1, wherein the processor utilizes a ply removal pattern to automatically control the actuator to move the first and second shuttles.

3. The ply manipulation system of claim 1, wherein the first ply manipulation tool module further comprises a sensor, and wherein the processor utilizes an input from the sensor to automatically control the actuator to move the first and second shuttles.

4. The ply manipulation system of claim 1, wherein the first ply manipulation tool module further comprises a linear drive member having a first portion and a second portion, wherein the first shuttle is received on the first portion and the second shuttle is received on the second portion.

5. The ply manipulation system of claim 4, wherein the first shuttle moves along the first portion and the second shuttle moves along the second portion such that the first and second shuttles move linearly toward and away from one another.

6. The ply manipulation system of claim 5, wherein the first shuttle moves to position the first gripper near a first edge of the ply, and wherein the second shuttle moves to position the second gripper near a second edge of the ply.

7. The ply manipulation system of claim 5, wherein the ply manipulation tool assembly further comprises a second ply manipulation tool module including
- a first shuttle including a first gripper and a first clamping element, the first clamping element linearly spaced apart from the first gripper,
- a second shuttle including a second gripper and a second clamping element, the second clamping element linearly spaced apart from the second gripper,
- a linear drive member having a first portion and a second portion, the first shuttle received on the first portion and the second shuttle received on the second portion, the first shuttle moving along the first portion and the second shuttle moving along the second portion such that the first and second shuttles move linearly toward and away from one another, and
- an actuator,
- wherein the first and second ply manipulation tool modules are received on a longitudinal linear drive member such that the first and second ply manipulation tool modules move toward and away from one another along a path defined by the longitudinal linear drive member.

8. The ply manipulation system of claim 4, wherein the linear drive member is a screw assembly, the first portion is a first lead screw portion of the screw assembly, and the second portion is a second lead screw portion of the screw assembly, and wherein threads of the second lead screw portion are opposite to threads of the first lead screw portion.

9. The ply manipulation system of claim 1, wherein the automated machine comprises a flange for coupling the ply manipulation tool assembly to the automated machine, and wherein the processor is configured for varying an angular position of the ply manipulation tool assembly with respect to the arm of the automated machine via the flange.

10. The ply manipulation system of claim 1, wherein each gripper is moveable to a position to grip the ply having the ply shape, and
- wherein the processor is configured for automatically adapting the position of each gripper according to the ply shape.

11. The ply manipulation system of claim 10, further comprising a lead screw having a first lead screw portion and a second lead screw portion, wherein the first shuttle is received on the first lead screw portion and the second shuttle is received on the second lead screw portion, and wherein threads of the second lead screw portion are opposite to threads of the first lead screw portion.

12. The ply manipulation system of claim 10, wherein the automated machine further comprises a second arm, and wherein a second ply manipulation tool assembly is attached to the second arm of the automated machine, the second ply manipulation tool assembly including a second ply manipulation tool module that comprises
- a first shuttle including a first gripper and a first clamping element, and
- a second shuttle including a second gripper and a second clamping element,
- wherein each gripper of the second ply manipulation tool module is moveable to a position to grip the ply and each clamping element of the second ply manipulation tool module is moveable to a position to be deployed outside the perimeter of the ply.

13. The ply manipulation system of claim 12, wherein the processor independently controls each of the first arm and the second arm of the automated machine and each of the first ply manipulation tool assembly and the second ply manipulation tool assembly, and wherein the processor is further configured for automatically adapting the position of each gripper of the second ply manipulation tool module according to the ply shape.

14. The ply manipulation system of claim 1, wherein the member of the first clamping element is a rod that extends from a cylinder supported on the first shuttle, and wherein the member of the second clamping element is a rod that extends from a cylinder supported on the second shuttle.

15. The ply manipulation system of claim 1, wherein the first shuttle comprises a first platform on which the first gripper and a plurality of first clamping elements are supported, wherein the second shuttle comprises a second platform on which the second gripper and a plurality of second clamping elements are supported, wherein each first clamping element of the plurality of first clamping elements includes a member that is extendable in the direction opposite the ply removal direction and that is selectively deployed in the direction opposite the ply removal direction, wherein each second clamping element of the plurality of second clamping elements includes a member that is extendable in the direction opposite the ply removal direction and that is selectively deployed in the direction opposite the ply removal direction, and wherein the first ply manipulation tool further comprises a first platform guiding rod extending parallel to the first platform to guide the first platform and a second platform guiding rod extending parallel to the second platform to guide the second platform.

16. A ply manipulation system, comprising:
- an automated machine having an arm;
- a ply manipulation tool assembly attached to the arm of the automated machine, the ply manipulation tool assembly including a first ply manipulation tool module that comprises
  - a first shuttle including a first gripper and a plurality of first clamping elements, each first clamping element of the plurality of first clamping elements linearly spaced apart from the first gripper,
  - a second shuttle including a second gripper and a plurality of second clamping elements, each second clamping element of the plurality of second clamping elements linearly spaced apart from the second gripper, and
  - an actuator; and a processor that automatically controls each of the plurality of first clamping elements and each of the plurality of second clamping elements and that automatically controls the actuator to move the first and second shuttles linearly with respect to one another to adapt the first and second grippers to a ply shape and to move at least one first clamping element and at least one second clamping element of the plurality of first and second clamping elements to a position to be deployed outside a perimeter of a ply being removed from a sheet of material such that the at least one first clamping element and the at least one second clamping element do not contact the ply, wherein each first clamping element of the plurality of first clamping elements includes a member that is extendable in a direction opposite to a ply removal direction to hold down material other than the ply being removed from a sheet of material, wherein each second clamping element of the plurality of second clamping elements includes a member that is extendable in the direction opposite to a ply removal direction to hold down material other than the ply being removed from a sheet of material, and wherein each first clamping element of the plurality of first clamping elements is individually controlled such that each first clamping element is selectively activatable in the direction opposite the ply removal direction and each second clamping element of the plurality of second clamping elements is individually controlled such that each second clamping element is selectively activatable in the direction opposite the ply removal direction.

\* \* \* \* \*